United States Patent
Matsuno et al.

(10) Patent No.: US 8,814,550 B2
(45) Date of Patent: Aug. 26, 2014

(54) POWDER SLUSH MOLDING MACHINE AND POWDER SLUSH MOLDING METHOD

(75) Inventors: Takemi Matsuno, Yokohama (JP); Denis Perinet, Simpsonville, SC (US); Jean Ruiz, Lauterbourg (FR)

(73) Assignees: Nakata Coating Co., Ltd., Kanagawa (JP); Faurecia Innenraum Systeme GmbH, Hagenbach (DE)

( * ) Notice: Subject to any disclaimer, the term of this patent is extended or adjusted under 35 U.S.C. 154(b) by 292 days.

(21) Appl. No.: 13/148,691

(22) PCT Filed: Feb. 8, 2010

(86) PCT No.: PCT/JP2010/051745
§ 371 (c)(1),
(2), (4) Date: Aug. 10, 2011

(87) PCT Pub. No.: WO2010/098198
PCT Pub. Date: Sep. 2, 2010

(65) Prior Publication Data
US 2011/0316184 A1   Dec. 29, 2011

(30) Foreign Application Priority Data
Feb. 25, 2009   (JP) .................................. 2009-042135

(51) Int. Cl.
B29C 41/00 (2006.01)
B29C 41/08 (2006.01)
B29C 41/22 (2006.01)
B29C 31/04 (2006.01)
B29C 41/36 (2006.01)
B29C 41/18 (2006.01)
B29C 41/34 (2006.01)
B29C 41/46 (2006.01)
B29C 41/02 (2006.01)

(52) U.S. Cl.
CPC ................. *B29C 41/18* (2013.01); *B29C 41/08* (2013.01); *B29C 41/003* (2013.01); *B29C 41/46* (2013.01); *B29C 41/22* (2013.01); *B29C 41/02* (2013.01); *B29C 31/045* (2013.01); *B29C 41/365* (2013.01); *B29C 41/34* (2013.01)
USPC .............................................. 425/96; 425/218

(58) Field of Classification Search
CPC ...... B29C 41/00; B29C 41/003; B29C 41/02; B29C 41/18; B29C 41/20; B29C 41/22
USPC .............................. 264/309; 425/100, 96, 218
See application file for complete search history.

(56) References Cited

U.S. PATENT DOCUMENTS

| | | | | |
|---|---|---|---|---|
| 3,927,162 | A * | 12/1975 | Stalter, Sr. | 264/51 |
| 2001/0030241 | A1 * | 10/2001 | Kott et al. | 239/8 |
| 2003/0190411 | A1 * | 10/2003 | Donatti et al. | 427/133 |
| 2004/0094865 | A1 * | 5/2004 | Mellentine et al. | 264/240 |

FOREIGN PATENT DOCUMENTS

| | | |
|---|---|---|
| JP | 02-130112 | 5/1990 |
| JP | 02-178009 | 7/1990 |
| JP | 03-055219 | 3/1991 |
| JP | 2004/080686 | 9/2004 |
| JP | 2008-137272 | 6/2008 |

* cited by examiner

*Primary Examiner* — Larry Thrower
*Assistant Examiner* — Xue Liu
(74) *Attorney, Agent, or Firm* — Carmody Torrance Sandak & Hennessey LLP

(57) ABSTRACT

To provide a powder slush molding apparatus and a powder slush molding method that could quickly and stably produce a 2-color molded sheet-like article with high-durability and the like.

The present invention is directed to a powder slush molding apparatus provided with a powder slush part (Part A), a mold heating part (Part B), a mold cooling part (Part C), and a coating/demolding part (Part E) for manufacturing the 2-color molded sheet-like article and the powder slush molding method thereof. After a 1-200 μm thick coating layer consisting of a first resin is coated by a resin coating device in the coating/demolding part, a sheet-like article consisting of a second resin which is different from the first resin is molded on or adjacent to the coating layer consisting of the first resin in the powder slush part.

8 Claims, 14 Drawing Sheets

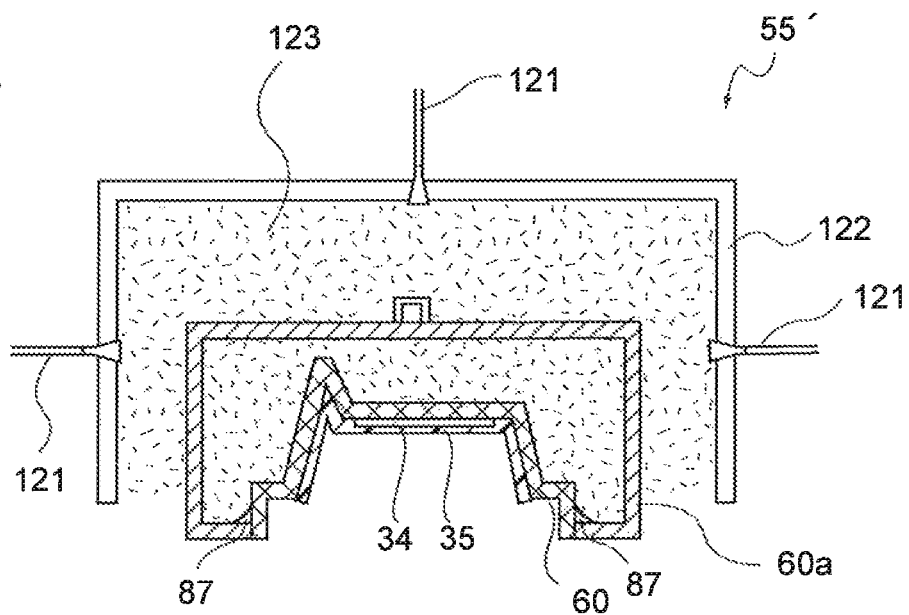
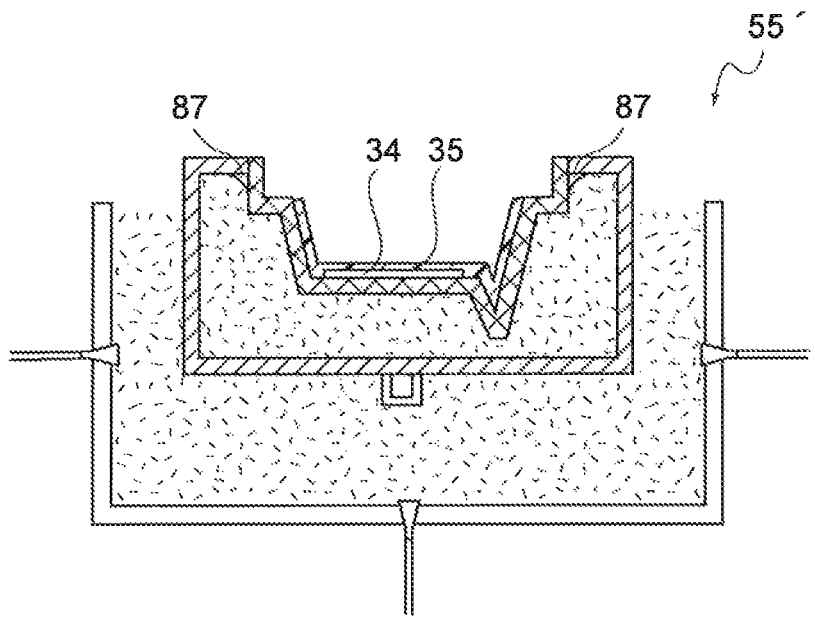

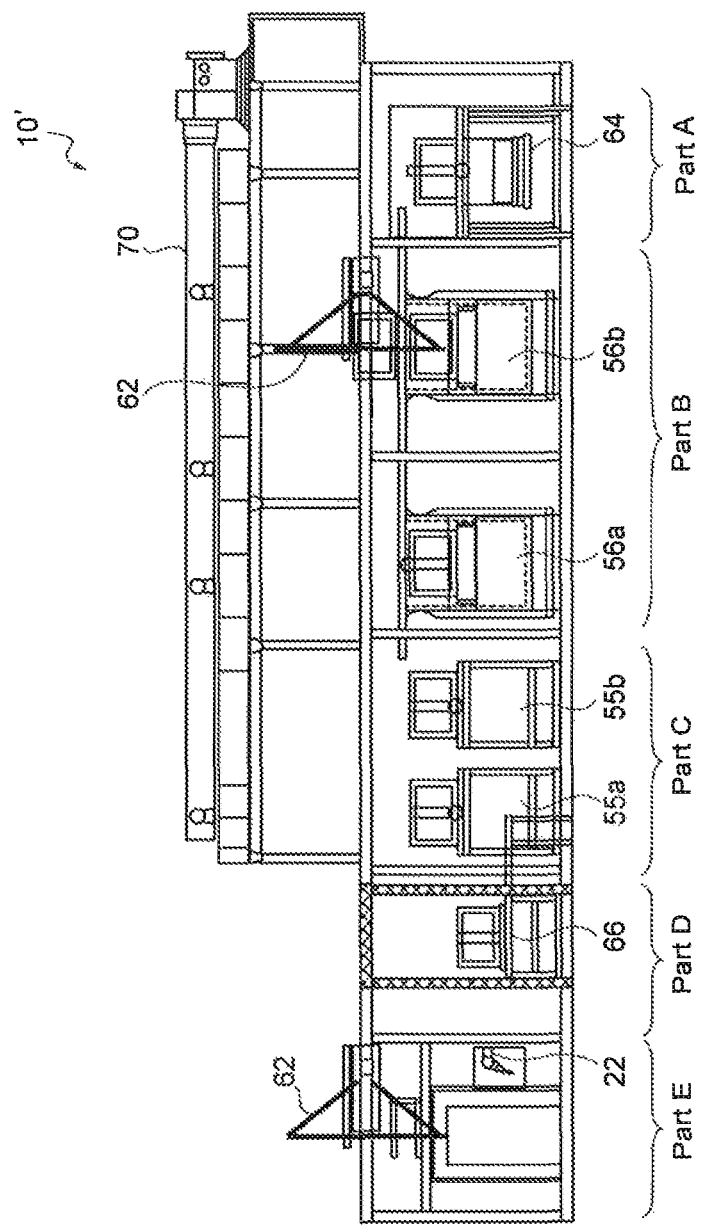

POWDER SLUSH MOLDING MACHINE AND POWDER SLUSH MOLDING METHOD

CROSS REFERENCE TO RELATED APPLICATIONS

This application is a National Stage of International Application No. PCT/JP2010/051745, filed Feb. 8, 2010, the subject matter of which is herein incorporated by reference in its entirety.

TECHNICAL FIELD

The present invention relates to a powder slush molding apparatus and a powder slush molding method, especially to the powder slush molding apparatus and the powder slush molding method, for stably molding a 2-color molded sheet having an excellent durability and the like.

BACKGROUND ART

Conventionally, for manufacturing a large complicated sheet-like article for automobile interior materials or the like, a powder slush molding method using a powder slush molding apparatus provided with a powder slush part and a mold cooling part for molding powder slush (powder resin) has widely been practiced.

Also, as illustrated in FIG. 15, a different-color surface skin manufacturing method featuring a powder slush molding method using respectively different resins 220 and 221 in both sides of a border part 215 of a mold 216 after a paste resin is sprayed from a nozzle has been proposed to provide a manufacturing method of a different-color surface skin of a clear border part (see, e.g. Patent Document 1).

PRIOR ART DOCUMENT

Patent Document

[Patent document 1] JPH02-130112A

SUMMARY OF THE INVENTION

Problems to be Resolved by the Invention

However, by using the conventional and proposed powder slush molding method, a good 2-color molded sheet-like article cannot be obtained precisely from multiple resins in a short period of time. In other words, it was difficult to have the good 2-color molded sheet-like article stably because the borders between multiple slush molded articles of the obtained 2-color molded sheet-like article were not clear and the mold temperature changed. Further, there was a problem such that the obtained 2-color molded sheet-like article was easy to break and lacked of durability because the strength of the borders between the multiple slush-molded articles was low.

On the other hand, coating a predetermined point using a coating device which is different from the powder slush molding device could be considered to make a 2-color molded sheet-like article after powder-slush-molding a sheet-like article. However, there was a problem that the adhesion strength between a powder slush molded material and a coated layer was poor and they tended to detach the mold. Even more, there was another problem that it was difficult not only to form a coating layer at an accurate position but also take too much time and a lot of facilities for forming a coated membrane and was economically disadvantageous. So the conventional 2-color molded sheet-like article had the problem that it lacked durability in actual uses.

As a result of the inventors earnestly devoted in consideration, they have found that a durable 2-color molded sheet-like article excellent in adhesiveness with multiple resin layers, less dispersion of membrane thickness, could be quickly and stably obtained by applying a first resin at a predetermined point on a mold by using a resin coating device and then applying a second resin on or adjacent to the coating layer consisting of the first resin of a predetermined thickness by using a powder slush molding.

More specifically, the inventions aim to provide the powder slush molding apparatus and the powder slush molding method that could quickly and stably obtain the durable 2-color molded sheet-like articles.

Means to Solve the Problem

According to the present invention, the powder slush molding apparatus is provided with a powder slush part, a mold heating part, a mold cooling part, and a coating/demolding part (processing part) for molding a 2-color molded sheet-like article; wherein the coating/demolding part is provided with a resin coating device to coat a first resin at a part of a mold for forming a coating layer of 1-200 μm thickness and the powder slush part is provided with a powder slush device for powder-slush-molding the sheet-like article consisting of a second resin which is different from the first resin on or adjacent to the coating layer consisting of the first resin, in order to solve the above problems.

More specifically, a predetermined resin coating device assembled in the powder slush molding apparatus could quickly and accurately form a letter, character, figure, or sheet-like coating layer consisting of the first resin at a predetermined point of the mold.

Further, as the powder slush device and the resin coating device are provided in the same molding apparatus, a sheet-like article having the predetermined-thickness consisting of the second resin which is different from the first resin could be quickly and stably obtained by using powder-slush-molding without necessary of special positioning.

Still further, since the coating layer is comparatively thin, the difference between the thermal conductivity at the formed place of the coating layer in a mold and the thermal conductivity at the unformed place of the coating layer in the mold becomes small, excellent adhesiveness could be obtained between the coating layer consisting of the first resin and the sheet-like article consisting of the second resin, and moreover the difference of the layer thickness between overlapping parts has no problem.

Furthermore, compared with the resin coating device practiced as a different device from the powder slush molding apparatus, no transportation device or the like between the powder slush molding apparatus and the resin coating device becomes necessary, consequently as a whole a compact powder slush molding apparatus could be provided.

Also, for constructing the powder slush apparatus of the present invention, it is preferred that the resin coating device provided at the coating/demolding part should be a spray resin coating device as the powder slush device.

Such a structure would efficiently coat the first resin at a desired mold position for forming a comparatively thin-membrane coating layer.

Further, when a comparatively thick coating layer which is thicker than 200 μm is formed and powder slush molding of the second resin is attempted, it becomes difficult to stably form a predetermined thickness powder slush molded layer on the coating layer from the second resin due to the relationship of thermal conductivity.

Also, for constructing the powder slush apparatus of the present invention, it is preferred that the end part of the spray resin coating device should be mounted with a spray nozzle having a resin coating hole, an atomized air hole, and a pattern air hole as the structure of the powder slush device of the inventions.

Such a structure would efficiently coat the first resin at a desired position of the mold to stably and quickly form a predetermined thickness-coating layer.

Also, for constructing the powder slush apparatus of the present invention, it is preferred that the end part of the spray nozzle should be L-shaped as the structure of the powder slush device of the inventions.

Such a structure would facilitate movement of the spray nozzle for efficiently coating the first resin even on a concave mold part.

Also, for constructing the powder slush apparatus of the present inventions, it is preferred that a compressor should be connected to an air inlet at the atomized air hole which is via a temperature control device, or which is via both the temperature control device and an air drying device.

Such a structure would minimize viscosity change of the first resin at the spray nozzle even in cold time like winter and coat the first resin more efficiently.

Also, for constructing the powder slush apparatus of the present invention, it is preferred that the resin coating device should be movably provided between a moving position and a stationary position in the coating/demolding part and should be provided with a shutter, if the resin coating device is at the moving position, for dividing and forming a motion area of the resin coating device.

Such a structure would downsize the powder slush device and more guarantee safety in use.

Also, for constructing the powder slush apparatus of the present invention, it is preferred that the resin coating device should be movably provided between the moving position and the stationary position in the coating/demolding part and should be provided with a shutter, if the resin coating device is at the moving position, for dividing and forming a motion area of the resin coating device.

Such a structure would completely separate the resin coating device job time from operator's job time and would enhance safety in use of the powder slush apparatus.

Also, for constructing the powder slush apparatus of the present invention, it is preferred that the resin coating device should be provided on the same side where the 2-color molded sheet-like article is demolded or on the opposite side, where the 2-color molded sheet-like article is demolded, via a mold inverting device in the coating/demolding part.

For example, if the resin coating device is provided on the same side where the 2-color molded sheet-like article is demolded, operator would observe visually or the like how the coating layer consisting of the first resin is formed. Accordingly, if a defect or the like is caused from the coating layer consisting of the first resin, such a defect or the like would be efficiently reduced.

On the other hand, if the resin coating device is provided on the opposite side, where the 2-color molded sheet-like article is demolded, via the mold inverting device, interference between the jobs of the resin coating device and the operator would be eliminated. Accordingly, it would omit predetermined concurrent motions on both sides of the mold via the mold inverting device, the aforementioned shutter, and the like.

Also, for constructing the powder slush apparatus of the present invention, it is preferred that the resin coating device not only should comprise the first resin coating device and the second resin coating device but also the coating/demolding part should be provided with a first coating/demolding part having the first resin coating device and a second coating/demolding part having the second resin coating device, and also a predetermined space for the mold to temporarily stand by should be provided between the first coating/demolding part and the second coating/demolding part.

Such a structure would have a resin coating process to multiple molds simultaneously or continuously, consequently the production efficiency of 2-color molded sheet-like articles would be more enhanced. In addition, such a structure would also use two kinds of the first resins (1' st resin and 1"st resin), whose composition, property or the like differs, to one mold as the first resin. Moreover, as the mold stand-by position is provided, not only the mold movement becomes smooth but also a predetermined time would be adjusted according to the coating situations of the first coating/demolding part and the second coating/demolding part.

Also, for constructing the powder slush apparatus of the present invention, it is preferred that a masking device should also be provided for not coating the first resin other than on the predetermined mold part in the coating/demolding part.

Such a structure would form the 2-color molded sheet-like article more efficiently.

Also, for constructing the powder slush apparatus of the present invention, it is preferred that the coating/demolding part should also be provided with a mold release agent resin coating device for coating a mold release agent on the mold.

Such a structure would facilitate the job for demolding the 2-color molded sheet-like article for efficiently forming a less-deformed 2-color molded sheet-like article excellent in dimensional accuracy.

Also, a different embodiment of the present invention is a powder slush molding method for molding a 2-color molded sheet-like article by using a powder slush molding apparatus having a powder slush part, a mold heating part, a mold cooling part, and a coating/demolding part comprises;
  a resin coating process for coating a first resin at a part of a mold for forming a coating layer of 1-200 µm thickness in the coating/demolding part,
  a process for heating the mold coated with the first resin in the mold heating part,
  a powder slush process for powder slush molding a sheet-like article on or adjacent to the coating layer consisting of the first resin using the second resin different from the first resin in the powder slush part, and
  a process for cooling the mold with the sheet-like article molded in the mold cooling part.

More specifically, a predetermined coating process would form a letter/character, figure, or predetermined thickness sheet-like coating layer consisting of a first resin at a predetermined point of the mold using the resin-coating device.

After that, a predetermined powder slush process would accuracy and quickly have the 2-color molded sheet-like article excellent in adhesiveness between the coating layer consisting of the first resin and the sheet-like article consisting of the second resin by powder slush molding the sheet-like article consisting of the second resin different from the first resin without receiving influences of thermal conductivity difference and membrane thickness of the mold surface caused by the coating layer.

Here, it is found that the influences of thermal conductivity difference and membrane thickness of the mold surface caused by the coating layer would further be minimized by using predetermined resin like heat-resistant vinyl chloride resin comprising thermal stabilizer, inorganic oxide or the like for the resin of the first resin.

Also, for practicing the powder slush mold method of the inventions, it is preferred that a process for demolding the 2-color molded sheet-like article from the mold is comprised after the mold is cooled and is moved to the coating/demolding part. Namely, a process for cooling the mold, moving it to the coating/demolding part, and demolding the sheet-like article should be comprised.

By carrying out like this process, the 2-color molded sheet-like article would be efficiently manufactured by practicing the coating process and the demolding process together and by using a comparatively small powder slush molding apparatus in the coating/demolding part.

BRIEF DESCRIPTION OF DRAWINGS

FIG. 5 is a figure supplied to describe the coating material tank and the like.
FIG. 10A to 10B are figures supplied to describe the mold cooling part.
FIG. 12 is a side view supplied to describe the powder slush molding device of the second embodiment.

BEST MODE FOR CARRYING OUT THE INVENTION

The following are concrete descriptions of suitable practical embodiments about the powder slush molding apparatus and the powder slush molding method of the inventions referring to Figures.

First Embodiment

Figure 1:
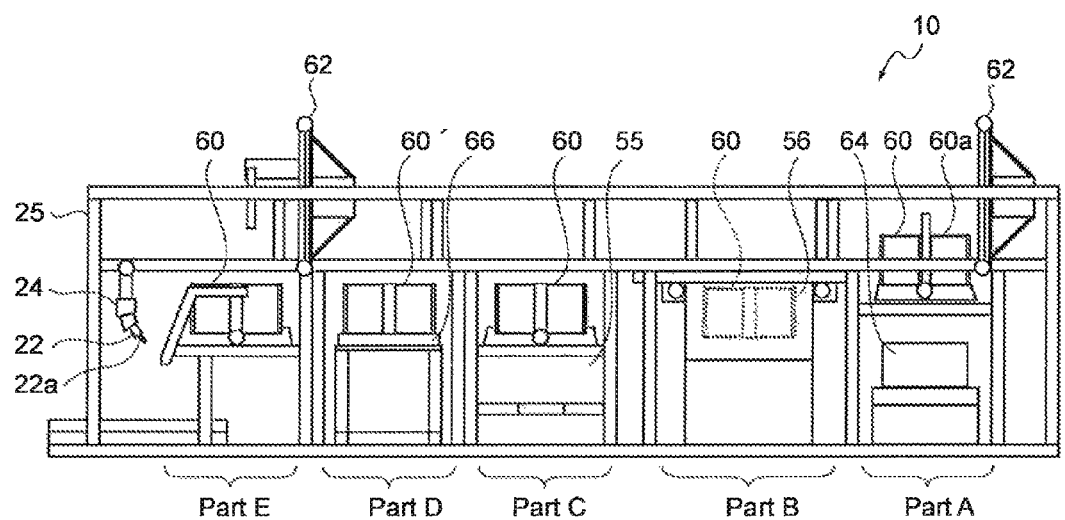
FIG. 1 is a side view supplied to describe the powder slush molding apparatus of the inventions.
Figure 2:
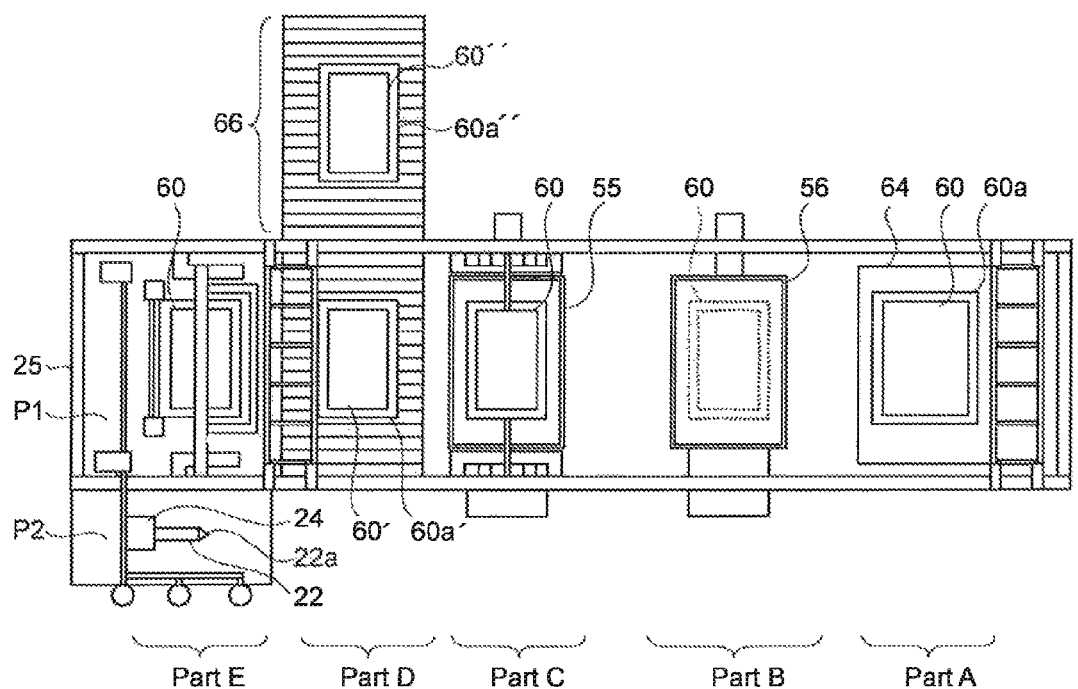
FIG. 2 is a plan view supplied to describe the powder slush molding apparatus of the inventions.

The first embodiment is, as illustrated in FIG. 1 and FIG. 2, a powder slush molding apparatus 10 provided with a powder slush part (Part A), a mold heating part (Part B), a mold cooling part (Part C), and a coating/demolding part (Part E) for molding a 2-color molded sheet-like article.

The powder slush molding apparatus 10 also features to provide with a resin coating device 22 that coats a first resin at a part of a mold 60 for forming a coating layer 34 of the thicknesses 1 μm to 200 μm in a coating/demolding part (Part E) and a powder slush device 64 for powder-slush-molding a sheet-like article 35 consisting of a second resin which is different from the first resin 21 on or adjacent to a coating layer 34 consisting of the first resin 21 in the powder slush part (Part A).

In addition, FIG. 1 shows a side view of the powder slush molding apparatus 10 and FIG. 2 shows a plan view of the powder slush molding apparatus 10 seen from above.

The following is a concrete description about a preferred embodiment of the powder slush molding apparatus 10.

1. Coating/Demolding Part (Processing Part)

(1) Basic Structure

The coating/demolding part (Part E) is a processing site for respectively demolding job of the 2-color molded sheet-like article 36 from a mold 60 and coating job to the mold 60 by the resin coating device 22.

As illustrated in FIG. 1 and FIG. 2, one of the molds 60 is mounted on a frame member 60a to facilitate movement and operation so that the mold 60 could mutually be moved together with the frame member 60a by, e.g. two cranes 62 between the powder slush part (Part A), heating part (Part B), cooling part (Part C), mold changing part (Part D) and the coating/demolding part (Part E).

Also, FIG. 1 shows an embodiment of five molds 60 supplied into one powder slush molding device 10.

More concretely, the powder slush part (Part A) illustrated in FIG. 1 shows one of the molds 60 lifted up by one of the cranes 62 after powder slush molding.

Further, the mold heating part (Part B) illustrated in FIG. 1 shows a predetermined mold 60 heated, which is to be moved to the powder slush part (Part A) by one of the cranes 62 in a predetermined time.

Still further, the cooling part (Part C) illustrated in FIG. 1 shows one of the molds 60 with the 2-color molded sheet-like article moved from the powder slush part (Part A) by one of the cranes 62 is being cooled.

More further, the mold changing part (Part D) illustrated in FIG. 1 shows the next mold 60' is standing by until a different mold 60 is moved to the coating/demolding part (Part E) by one of the cranes 62.

Moreover, the coating/demolding part (Part E) illustrated in FIG. 1 shows a coating job is being done to the corresponding mold for making the next the 2-color molded sheet-like article after the 2-color molded sheet-like article is demolded from the mold.

Thus, as illustrated in FIG. 2, while the 2-color molded sheet-like article is being demolded from the mold in the coating/demolding part (Part E), a resin coating device 22 moves to the side of the coating/demolding part (Part E) for forming a predetermined job space.

More specifically, the coating/demolding part (Part E) is structured so that the demolding job of the 2-color molded sheet-like article 36 and the coating job by the resin coating device 22 could be mutually done.

In addition, FIG. 1 shows five molds 60 supplied into one powder slush molding device 10, however, at least one mold 60 could be supplied for processing.

(2) Resin Coating Device

The embodiment of the resin coating device 22 provided in the coating/demolding part (Part E) is not especially limited if the predetermined thickness coating layer 34 could be formed. However, it is preferred that the embodiment should comprise a nozzle part (it may also be called "spray nozzle") 22a to discharge the first resin 21 or 21', a drive device 24 to decide the position and the rotational direction of the nozzle part 22a, and a coating material storage part 51 for storing the first resin 21 or 21' as illustrated in FIG. 3.

More specifically, the nozzle part 22a and drive device 24 of the resin coating device 22 could evenly and quickly coat the first resin 21 or 21' stored in the coating material storage part 51 at a predetermined place of the mold 60.

In addition, the drive device 24 of the nozzle part 22a could arbitrarily change the position and discharge direction of the nozzle part 22a; even if the mold 60 is convexo-concave, the nozzle part 22a enters a predetermined place and discharges coating liquid from the proximate position to efficiently form an evenly thick coating layer 34.

Figure 3:
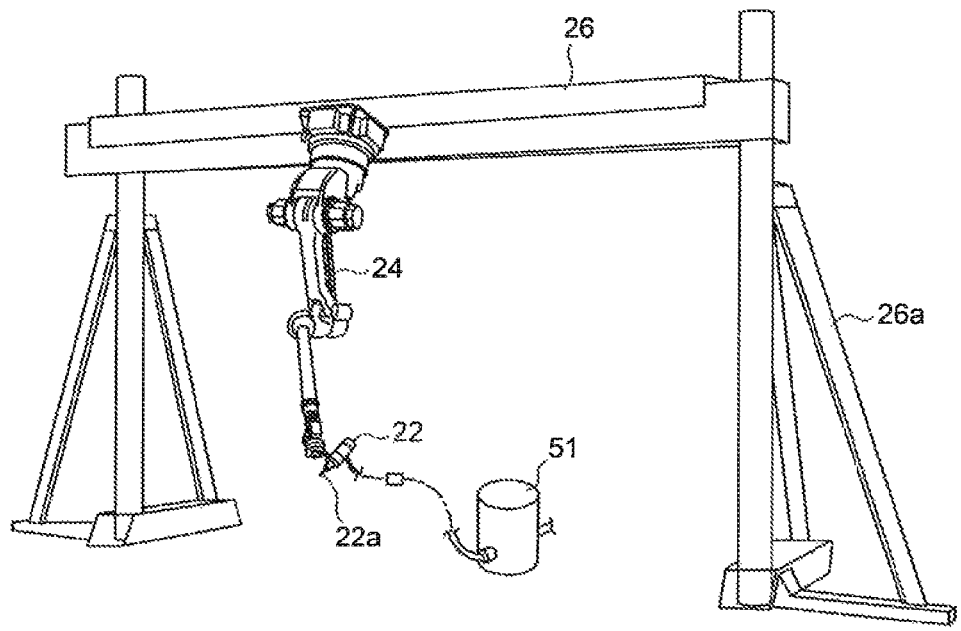
FIG. 3 is a figure supplied to describe the coating device.

Also, as illustrated in FIG. 3, the drive device 24 of the nozzle part 22a could be perpendicularly suspended, a support bar 26 to change the position in the horizontal direction could be provided, and a support part 26a to strongly hold the drive device 24 or the like of the nozzle part 22a comprising the support bar 26 could also be provided on both sides.

(2)-1 Nozzle Part

The nozzle part 22a is, as illustrated in FIG. 3, a device mounted on the end part of the resin coating device 22 to partly spray a predetermined coating material onto a mold part. In addition, it is preferred that the nozzle part 22a should be a combined device that could also partly coat a wash liquid or a mold release agent other than the coating material.

Figure 4A:
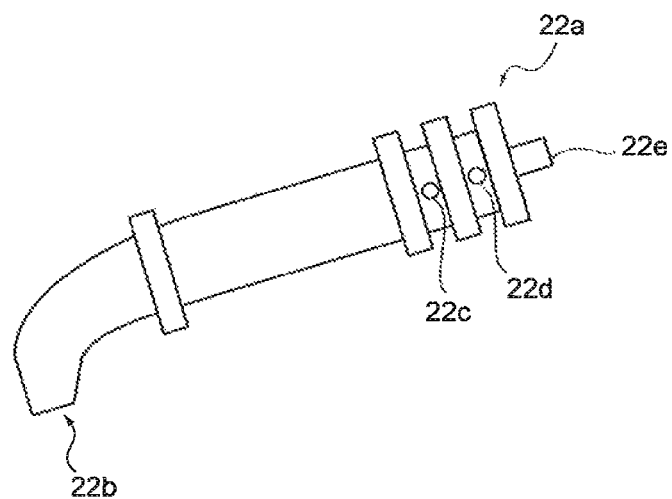
FIG. 4A to 4B are figures supplied to describe the spray nozzle.
Figure 4B:
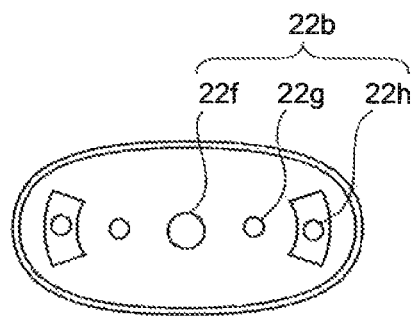

Here, as illustrated in FIG. 4A to 4B, it is preferred that the nozzle part 22a should be a spray nozzle as a sprayer that sprays the first resin 21 or 21'.

The reason for this is because such a spray nozzle could efficiently coat the first resin 21 or 21' on a large area of a desired position of the mold 60 even if the surface of the mold 60 is convexo-concave.

Then, as illustrated in FIG. 4B, it is preferred that the end part 22b of the spray nozzle 22a should have a resin coating hole 22f, an atomized air discharge hole 22g, and a pattern air discharge hole 22h. In this embodiment, the circular atomized air discharge hole 22g is provided on both sides of one circular resin coating hole 22f and the pattern air discharge hole 22h is provided on both outsides as a hole provided on a wall-like protrusion.

Also, as illustrated in FIG. 4A, the back end part of the spray nozzle 22a is provided with a resin passing hole 22e provided with a needle valve (not shown in a figure), a pattern air intake hole 22d to take in pattern air, and an atomized air intake hole 22c to take in atomized air.

So the structure of the spray nozzle 22a could detect the desired position of the mold 60 to efficiently coat the first resin in response to the motion of the needle valve (not shown in a figure).

More specifically, simply when resin is discharged by the needle valve (not shown in a figure), only the resin coating hole 22f is used; when it is coated onto a large area in a misty condition, the resin is discharged from the resin coating hole 22f and predetermined air is belched from the atomized air hole 22g.

Thus, if there is a circular or elliptical coating pattern and a predetermined place is intensively coated, the resin is discharged from the resin coating hole 22f and predetermined air is belched from the pattern air hole 22h.

Also, as illustrated in FIG. 4A, it is preferred that the end part 22b of the spray nozzle 22a should be L-shaped.

The reason for this is because such a structure could efficiently coat the first resin from a proximity position even if the mold 60 has concave parts or deformed places.

More specifically, if the end part 22b of the spray nozzle 22a is L-shaped, coat could partly or completely enter or be sprayed close to the mold 60 even if the mold 60 is concave or deformed.

Also, the end part of the spray nozzle 22a should not always be curved 90° to make the end part of the spray nozzle 22a L-shaped. It could be, for example, curved in the range of 60° to 120° in the linear direction of the shank of the spray nozzle 22a.

(2)-2 Drive Device

The drive device 24 of the nozzle part 22a is a device, as illustrated in FIG. 3, that moves the spray resin coating device 22 from a predetermined place to another predetermined place under the condition of the nozzle part 22a mounted on the end for coating the mold 60.

Accordingly, a 3-axis, 6-axis or the like handler robot is suitable for the drive device 24 of the nozzle part 22a.

Also, it is preferred that the drive device 24 of the nozzle part 22a should be a suspension robot as illustrated in FIG. 3. More concretely, it is preferred that the drive device 24 should be mounted as a robot for a support bar 26 provided with a predetermined rail (not shown in a figure).

The reason for this is because the drive device 24 consisting of such a suspension robot could move, if not used, up and down and rightward and leftward of the mold 60 for forming a predetermined job space.

Accordingly, when the 2-color molded sheet-like article is demolded from the mold, the drive device 24 of the nozzle part 22a could move the spray resin coating device 22 to a predetermined place of the coating/demolding part (Part E) and form a job space to do a predetermined job there.

On the other hand, after the 2-color molded sheet-like article is demolded from the mold, the spray resin coating device 22 could be moved to a predetermined place of the mold 60 to do the first resin coating job again.

So, one coating/demolding part could perform the coating process using the spray resin coating device and the demolding process not using the spray resin coating device respectively to minimize the whole powder slush device for space saving.

(2)-3 Coating Material Storage Part

Figure 5:
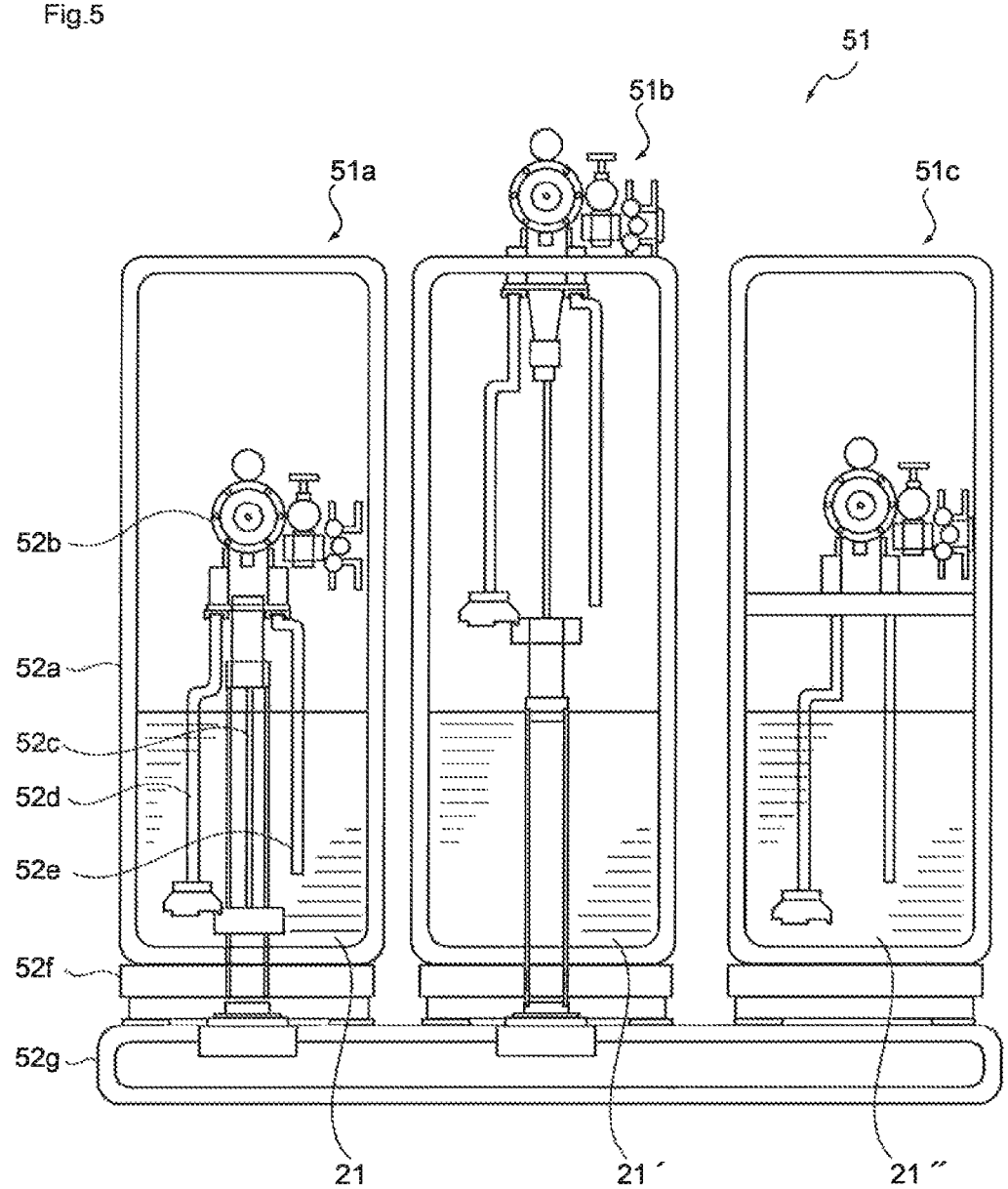

The coating material storage part 51 is a device, as illustrated in FIG. 3 or FIG. 5, that stores the first resin 21 or 21' in the tanks 51a and 51b and supplies the first resin 21 or 21' to the spray resin coating device 22 by a predetermined pump or the like as needed.

In addition, it is preferred that multiple tanks 51a and 51b should be provided for storing multiple kinds of different colors, concentrations or viscosity of the first resin 21 or 21' as illustrated in FIG. 5.

Accordingly, for example, two or more color coating parts could be formed, a mixed color coating part could be formed, a coating part having graduation could be formed, or an accurately coated part could be formed according to environment temperatures.

Moreover, if multiple tanks 51a and 51b are provided, the first resin 21' could ceaselessly be applied from the next tank 51b even if the first resin 21 in the tank 51a lacks.

Also, FIG. 5 shows the tank 51a is supplying a coating material to the spray resin coating device 22 while the first resin 21 is being agitated and also shows the other tank 51b stops agitation of the first resin 21' right after a predetermined amount of the first resin 21' filled.

Thus, the multiple tanks 51a and 51b are provided with at least a cabinet 52a, a kind of motor 52b, an agitation device 52c, a coating material suction port 52d, and a temperature sensor 52e respectively, all of which are on a load cell 52f.

Accordingly, the first resin 21 stored inside the cabinet 52a of the tank 51a could be suctioned from the coating material suction port 52d to quantitatively put it into the spray resin coating device 22 while it is being agitated by a kind of motor 52b.

Also, as the temperature inside the tank 51a is kept to, e.g. 30° C. to 80° C. by the sensor 52e, the viscosity of the first resin 21 drops and is stabled so that the first resin 21 could be stably taken into the spray resin coating device 22 without clogging.

Moreover, as multiple tanks 51a and 51b are on the load cell 52f that could measure load changes, the change of the amounts of the first resin 21 or 21' stored in the multiple tanks 51a and 51b could be monitored and the coating amount could be adjusted, consequently the thickness of the obtained coating layer could be adjusted into a predetermined area.

Furthermore, a grid-like supporting table 52g is provided under the load cell 52f so that the first resin 21 or 21' leaked out could be easily cleaned off.

Moreover, as illustrated in FIG. 5, it is preferred that a tank 51c for storing a wash liquid (detergent) 21", e.g. thinner for automatically washing the spray resin coating device 22 or the like should also be provided.

The reason for this is because such a structure could automatically wash the insides of the pipe and the nozzle by wash liquid 21" even if a different color first resin 21' is used from the first resin 21 or the motion of the resin coating device 22 stops for a predetermined time of period.

Accordingly, a further provision of the tank 51c for storing detergent could efficiently prevent solidification, color mixture, etc. of the first resin insides the pipe and the nozzle even if a different color first resin is used or the like.

Also, as the tank 51c for storing detergent is on the load cell 52f that could measure load changes, a weight change of the wash liquid 21" stored in the tank 51c could be monitored and a processing amount could also be adjusted.

(3) Coating Layer
(3)-1 First Resin

The first resin 21 composing of the coating layer 34 could be alone or combination of two or more kinds of an epoxy resin, a phenolic resin, a silicone resin, a polyacrylic resin, a polyester resin, a polyimide resin, a polyolefin resin, a polyurethane resin, a polyvinylchloride resin, a fluorine resin and the like.

Further, it is preferred that the first resin 21 should be heat-resistant vinyl chloride sol composed of vinyl chloride resin, hardener, plasticizer and the like, heat-resistant acrylic sol composed of an acrylic resin, a hardener, a plasticizer and the like, or something similar to that as heat-resistant plastic.

Moreover, it is preferred that a vinyl chloride resin graft-copolymerized with N-substituted maleimide should be used to improve thermal resistance of the vinyl chloride resin or the like.

The N-substituted maleimide could be, e.g. an aliphatic maleimide of N-methylmaleimide, N-ethylmaleimide, N-n-propyl maleimide, N-isopropyl maleimide, N-n-butylmaleimide, N-t-butylmaleimide, N-hexylmaleimide, N-lauryl maleimide, or the like; an alicyclic maleimide of N-cyclohexylmaleimide, N-bicyclo (2,2,1) heptyl 2-methyl maleimide, or the like; or an aromatic maleimide of N-phenyl maleimide, N-(o, m- or p-) hydroxyphenyl maleimide, N-(o, m- or p-) methoxypheny maleimide, N-(o, m- or p-) chlorophenyl maleimide, N-(o, m- or p-) carboxyphenyl maleimide, N-(o, m- or p-) nitrophenyl maleimide, N-9,10-ethano9,10-dihydroanthracenemaleimide, N-triphenyl methyl benzyl maleimide, N-(o, m- or p-) methyl phenyl maleimide, or the like.

More specifically, such a heat-resistant plastic sol not only could have good coating properties as a coating material but also produces no thermal decomposition problem under a predetermined environmental condition (e.g. 200° C. to 500° C., 1 min to 30 min) to strongly attach with the powder slush molding resin.

Also, it is preferred that a predetermined amount of cross-linker, cross-linking accelerator, inorganic oxide, or thermal stabilizer should be added to improve the thermal resistance of the first resin.

For example, an amine compound or the like would be added to an epoxy resin as a cross-linker. Further, an acid compound, an alkaline compound or the like would be added to a phenolic resin as a cross-linker accelerator. Further, an acid compound or the like would be added to a silicone resin as a cross-linker accelerator. Further, a radical generating agent, an isocyanate compound or the like would be added to a polyacrylic resin as a cross-linker. Further, an isocyanate compound or the like would be added to a polyester resin as a cross-linker accelerator. Further, an acid compound or the like would be added to a polyimide resin as a cross-linker accelerator. Further, a phenolic resin or the like would be added to a polyvinylchloride resin as a cross-linker.

It is normally preferred that an amount of 0.1 to 10 weight parts of such a cross-linker or a cross-linking accelerator should be added to the amount of 100 weight parts of the vinyl chloride resin or the like and is more preferred that an amount of 0.5 to 5 weight parts should be added.

Also, it is preferred that an oxidized titanium, oxidized alumina, zirconium oxide, silica, calcium carbonate, talc or the like should be add as inorganic oxide. It is normally preferred that an amount of 0.1 to 30 weight parts of such inorganic oxide should be added to the amount of 100 weight parts of the vinyl chloride resin or the like and is more preferred that an amount of 1 to 20 weight parts should be added.

Moreover, the thermal stabilizer could be a lead salt series stabilizer of lead white, tribasic lead sulfate, dibasic lead phosphite, dibasic lead phthalate, tribasic maleate lead, lead silicate or its silica gelcoprecipitate, or the like; a metal soap of magnesium soap, calcium soap, barium soap, cadmium soap, zinc soap, lead soap, tin soap, or the like; an liquid-like stabilizer of cadmium barium series, cadmium barium zinc series, barium zinc series, or the like; an organic tin series stabilizer of tin alkyl sulfur compound, tin aryl sulfur compound, tin alkyl oxygen compound, tin aryl oxygen compound, organic tin carboxylic acid, organic tin mercaptide, or the like; an epoxy series stabilizer of glycidylether or epoxy resin, alkyl ester of epoxidised fats or epoxidised natural fat acid or resin acid, epoxy derivatives, or the like; an organic phosphite compound of trialkylphosphite, triphenyl phosphite, triarylphosphite, or the like; and polyalcohol, amine compound, or the like.

It is normally preferred that an amount of 0.1 to 20 weight parts of such a thermal stabilizer should be added to the amount of 100 weight parts of the vinyl chloride resin or the like and is more preferred that an amount of 1 to 10 weight parts should be added.

(3)-2 Thickness

The thickness of the coating layer 34 in the dried condition essentially consisting of the first resin 21 must be in the range of 1 μm to 200 μm.

The reason for this is because, if the thickness of the coating layer is less than 1 μm, the mechanical strength of the coating layer may drop or the chromogenic properties may lack.

On the other hand, if the thickness of the coating layer exceeds 200 μm, the temperature difference (thermal conductivity difference) between a mold and an unheated part becomes big. Consequently it may become difficult to have an even-thickness 2-color molded sheet-like article having an excellent adhesion between multiple resin layers.

Accordingly, it is more preferred that the thickness of the coating layer 34 essentially consisting of the first resin should be in the range of 5 µm to 100 µm, the value area of 10 µm to 50 µm is much more preferred, and the value area of 15 µm to 30 µm is the most preferred.

(4) Masking Tool

Figure 6A:
FIG. 6A to 6E are figures supplied to describe the powder slush molding method of the inventions.
Figure 6B:
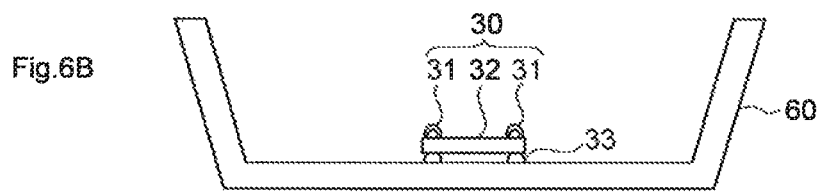
Figure 6C:
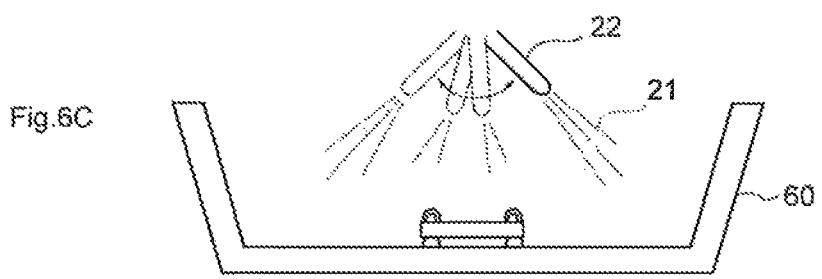

The structure of a masking tool 30 is not especially limited but is preferred to be a shaped member that covers others than a desired coating place to correspond with a mold and to be a flat plate-like plastic member 32 with a handle 31 to equip an adsorption part 33 on the mold 60 as illustrated in FIG. 6B or FIG. 6C.

More specifically, after a predetermined mold 60 is prepared as illustrated in FIG. 6A, the masking tool 30 is arranged and fixed to a predetermined position on the mold 60 utilizing the adsorption part (air adsorption part) 33 as illustrated in FIG. 6B.

Figure 6D:
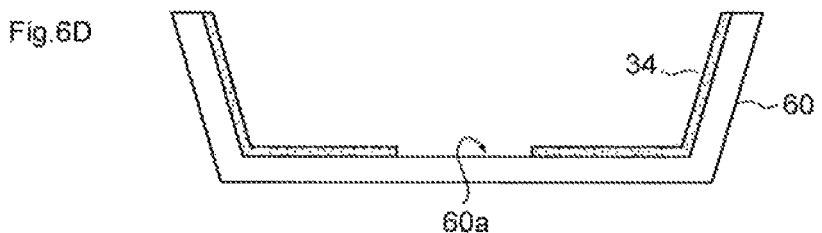

Then, as illustrated in FIG. 6C, for example, the first resin is sprayed by the resin coating device 22, and as illustrated in FIG. 6D, the masking tool 30 is removed to have the mold 60 with the coating layer 34 only at a predetermined place.

Figure 6E:
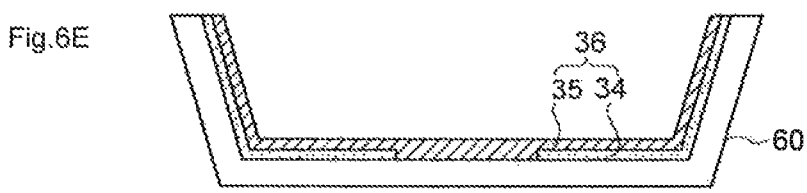

So, as illustrated in FIG. 6E, the sheet-like article 35 essentially consisting of the second resin 92 could be formed on it by using the powder slush molding explained later, consequently the 2-color molded sheet-like article 36 made by 2-color molding could be obtained.

More specifically, the coating layer 34 consisting of the first resin exposes from both wings of the mold 60; the coating layer 34 consisting of the first resin partly laps over the sheet-like article 35 of the second resin around the bottom center of the mold 60 but the sheet-like article 35 consisting of the second resin exposes, consequently as a whole the 2-color molded sheet-like article 36 is obtained.

(5) Shutter

As illustrated in FIG. 1, it is preferred that a shutter 25 to separate and form the motion area of the resin coating device 22 should be provided at a predetermined place of the coating/demolding part (Part E).

More specifically, the resin-coating device 22 for coating the first resin is movably provided between a moving position (P1) and a stationary position (P2). If the resin-coating device 22 is at the moving position (P1), it is preferred that the shutter 25 to separate and form the motion area of the resin-coating device 22 should be structured to close.

The reason for this is because the provision of the shutter 25 to separate and form the motion area of the resin coating device 22 could not only minimize the powder slush device 10 but also more guarantee safety in use.

More concretely, if an area sensor (not shown in a figure) judges someone is in a predetermined area for a demolding job, the resin coating device 22 stays at the stationary position (P2) and the shutter 25 remains open as illustrated in FIG. 2.

Then, if the area sensor (not shown in a figure) judges no one is in the predetermined area, the resin coating device 22 moves from the stationary position (P2) to the moving position (P1), the shutter 25 closes, and on one could enter the predetermined area.

So, the coating process could be safely and surely done to the mold 60 by the resin coating device 22 under the condition of no one in the predetermined place of the coating/demolding part (Part E).

Also, the provision of the shutter 25 could reduce pressure, produce a predetermined airflow, or provide a predetermined exhaust system at a predetermined space of the coating/demolding part (Part E), so the first resin flied apart from the resin coating device 22 to other than the predetermined place could be efficiently collected.

2. Mold Heating Part (1) Hot-Air Blowoff Part

The structure of the hot-air blowoff part for directly heating the mold 60 in the mold heating part (Part B) is not especially limited but it is preferred that the structure should be, for example, such that the hot air obtained by a hot-air generator (not shown in a figure) is supplied to a hot-air blowoff port 16 via a main pipe 43 by an air supply fan 46 provided below or under a hot-air blowoff port 16 as respectively illustrated in FIG. 7A to 7B.

More specifically, it is preferred that the structure should be such that the hot air obtained by the hot-air generator and the hot air retrieved from the inside of the furnace through an energy retrieving part 54 and fed into a mixing room 44 by an air circulate fan 42 are timely mixed together in the mixing room 44 and then supplied by the air supply fan 46 to the hot-air blowoff port 16 via the main pipe 43 as a large amount of hot air having a predetermined air speed.

The reason for this is because the structure could efficiently transfer the heat in a hot air 14 to the mold 60 when the hot air 14 flows along the inside face of the mold 60 in the heat mode of the mold 60 in a heating furnace 58.

More specifically, as heat mainly transmits in the heat transfer mode, the less heat supplied into the heating furnace 58 diffuses out the heating furnace 58.

Accordingly, even if the heating furnace 58 and a hot-air generation circulator 40 are small, they have equal or more productivity compared with a conventional large heat furnace. In addition, mixture of the hot air from the hot-air generator (not shown in a figure) supplied via the hot-air blowoff port 16 with the hot air retrieved from the furnace interior via the energy retrieving part 54 increases air volume and pressurizes the inside of the heating furnace 58 or the like, so the heating effect to the mold 60 increases.

Moreover, as the energy retrieving part 54 provided around or under the heating furnace 58 becomes depressurized compared with the heating furnace 58 due to the relationship of air volume, the hot air after heating by the mold 60 could be retrieved more effectively.

Figure 7A:
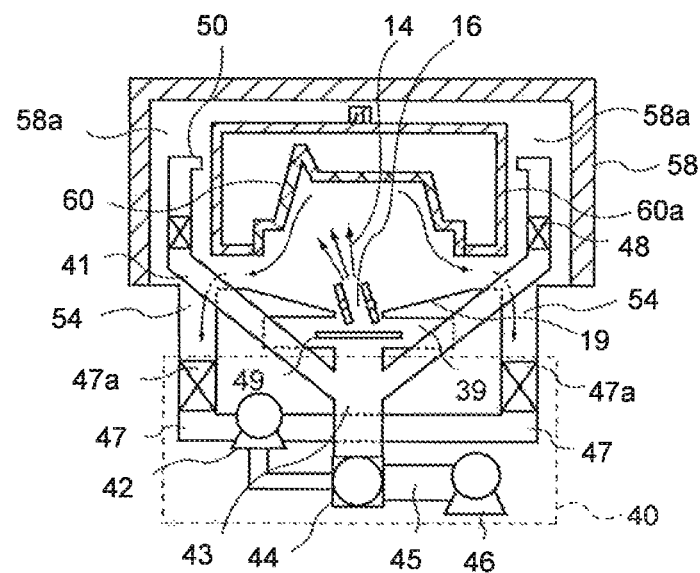
FIG. 7A to 7B are figures supplied to describe the relationship between the bottom face in a furnace, the hot-air blowoff part and the energy retrieving part of the mold heating part.
Figure 7B:
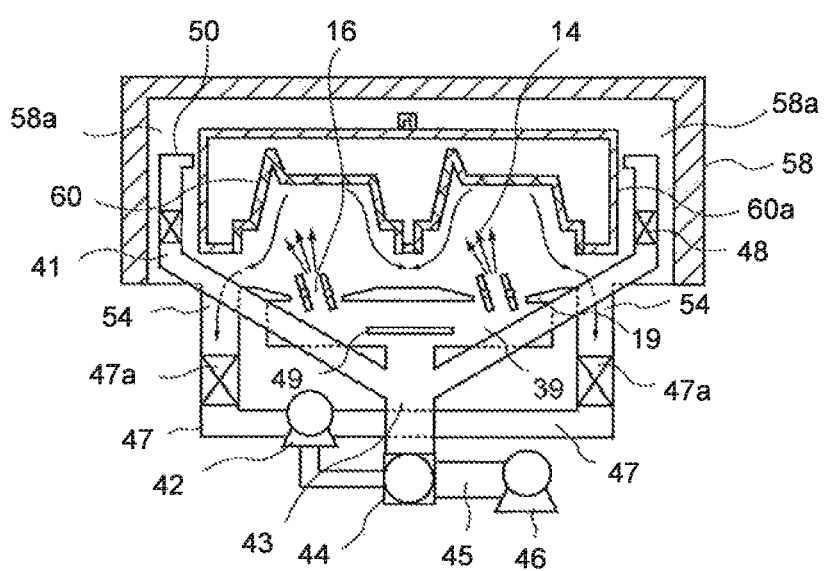

Also, it is preferred that a hot-air reservoir room 39 should be provided halfway the main pipe 43 and an obstacle plate 49 should be provided at the outlet part in the hot-air reservoir room 39 as respectively illustrated in FIG. 7A to 7B.

The reason for this is because the structure could disperse the hot air fed in from the air supply fan 46 by the obstacle plate 49 and could blowoff hot air evenly from each hot-air blowoff port even if a plural number of the hot-air blowoff ports 16 are provided.

Also, it is preferred that the shape of the opening part at the hot-air blowoff part should be circular, ellipse, quadrangle (comprising square, rectangle, belt-like or the like), or polygon to blowoff hot air in a controlled condition.

(2) Energy Retrieving Part

Also, it is preferred that an energy retrieving part to retrieve hot air (heat energy) having a lot of energy, temperature not a little still high, after heating the mold 60 should be provided as respectively illustrated in FIG. 7A to 7B.

More specifically, it is preferred that such an energy retrieving part 54 should be provided using the bottom face 19 in the heating furnace 58 or the periphery of the heating furnace 58.

Here, the structure itself of the energy retrieving part 54 is not especially limited but it is preferred that, for example, a duct structure having an opening part that goes through the bottom face 19 inside the heating furnace 58 and through a branch pipe 47 continuing into the hot-air generation circulator 40 should be provided as illustrated in FIG. 7A. Then, as already referred to above, it is preferred that a damper 47a should be provided halfway the branch pipe 47 continuing into the energy retrieving part 54.

(3) Heating Furnace (3)-1 Basic Structure

It is preferred that, as respectively illustrated in FIG. 7A to 7B, the heating furnace 58 in the mold heating part (Part B) should as a whole be arranged above the hot-air generation circulator 40 to structure a compact heating device. Such a structure could not only facilitate supply of heat energy to the heating furnace 58 but also could facilitate retrieval of heat energy from the heating furnace 58 using the energy retrieving part 54.

Further, FIG. 7A is an embodiment of the mold 60 for molding one 2-color molded sheet; FIG. 7B is another embodiment of the mold 60 for simultaneously molding two 2-color molded sheets.

Still further, the furnace body of the heating furnace 58 is, as respectively illustrated in FIG. 7A to 7B, formed of a plane rectangle box-like body having an openable/closable opening part on the top face so that the mold 60 is heated up by the hot air 14 blown in by the hot-air generation circulator 40 after supplying the mold 60 and its frame member 60a into the furnace under the condition of the opening part on the top face open and then closed.

Moreover, the embodiment of the furnace body providing the heating furnace 58 is changeable in need. It is preferred that the furnace body should be, e.g. cylindrical, cubic, or differently shaped.

(3)-2 Side Hot-Air Blowoff Part

Also, it is preferred that a duct structure, i.e., a side hot-air blowoff port 50 branching from the outlet part of the main pipe 43, having a predetermined height, extending perpendicularly, as respectively illustrated in FIG. 7A to 7B, should be provided so that the mold 60 in the heating furnace 58 could be heated from the sides.

In addition, it is preferred that the side hot-air blowoff port 50 should be arranged along the inside of the heating furnace 58 and be connected with a branch pipe 41 or the main pipe 43 continuing into the hot-air generation circulator 40 so that the air volume is adjusted by a damper 48 or the like.

The reason for this is because such a structure could heat up the mold 60 by hot air not only from below but also from the lateral sides for effectively heating up the mold 60 more.

Thus, it is preferred that the shape of the side hot-air blowoff port (duct) 50 should be changed in need according to the shape of the mold. However, if a snorkel type is employed, for example, the distance between the side hot-air blowoff port 50 and the mold 60 could be easily controlled to a fixed area and the hot-air blowoff direction could also be fixed for increasing the heating efficiency of the mold 60.

(4) Temperature

Also, it is preferred that the surface temperature of the mold 60 should be in the range of 200° C. to 500° C. for heating the mold 60 formed of the coating layer 34 by the heating furnace 58 in the mold heating part (Part B) as respectively illustrated in FIG. 7A to 7B.

The reason for this is because if the mold surface temperature becomes lower than 200° C., it may happen to be difficult to stably form an evenly thick molding membrane in the powder slush process. On the other hand, if the mold surface temperature exceeds 500° C., a formed coating layer may happen to be damaged by heat or the mold may also happen to be damaged by heat in a long time use.

Accordingly, it is more preferred that the mold surface temperature should be in the range of 220° C. to 400° C. and the range of 250° C. to 350° C. is further preferred.

3. Powder Slush Part (1) Basic Structure

The powder slush part (Part A) is a site that practices the process to integrally connect up and down the mold 60 comprising the heated frame member 60a with the reservoir tank 88 storing the fluidized powder 92 as the second resin under the conditions of the mold face 85 of the mold (molded pattern) 60 facing down and the opening face of the reservoir tank 88 facing up as illustrated in FIG. 8.

More concretely, FIG. 8A to 8C and FIG. 9A to 9B shows the powder slush molding method in the powder slush part.

Figure 8A:
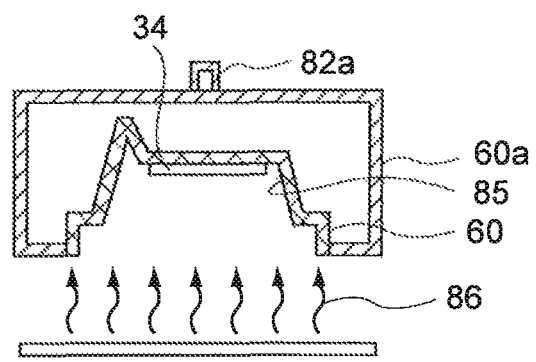
FIG. 8A to 8C are figures supplied to describe the powder slush molding method of the inventions (#1).

More specifically, as illustrated in FIG. 8A, the hot air 86 in the heating furnace heats up the mold 60 formed by the coating layer 34 to a predetermined temperature.

Figure 8B:
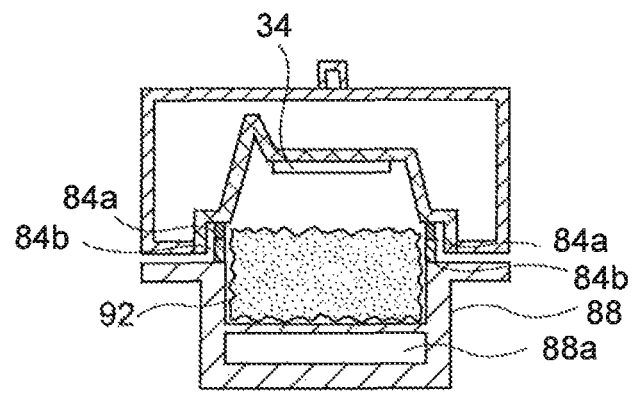

After that, as illustrated in FIG. 8B, the mold 60 formed by the coating layer 34 is placed above the reservoir tank 88.

Figure 8C:
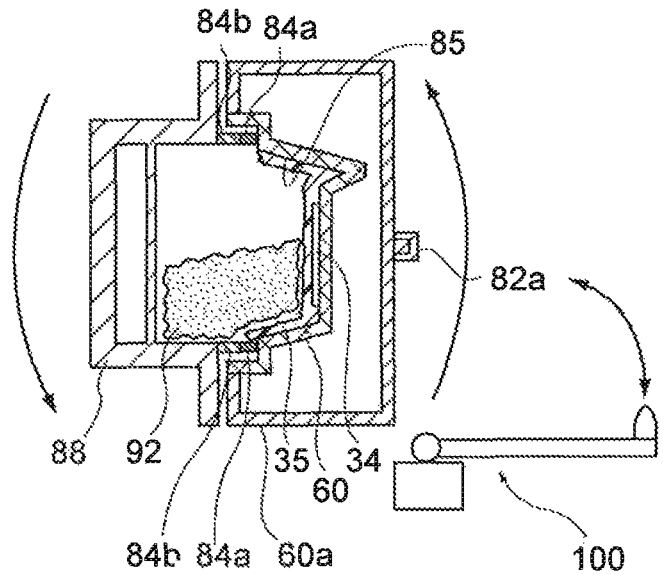

After that, as illustrated in FIG. 8C, the mold 60 formed by the coating layer 34 is rotated together with the reservoir tank 88.

Then, when these are rotated, it is preferred that air should be taken into an agitation room 88a provided below the reservoir tank 88 to make the powder 92 be into a fluidized state for improving dispersibility of the powder 92 in the reservoir tank 88 and forming an evenly thick sheet-like article (resin coating layer) 35. More specifically, it is preferred that the upper part of the agitation room 88a should be composed of a hole open member (mesh member) to blow up the powder 92 by the air take in.

Moreover, when they are rotated, it is preferred that the vibration member 82a provided on the frame member 60a should be repeatedly hit by a hammer 100 to vitalize the flow state of the powder 92 for forming even films as illustrated in FIG. 8C.

Figure 9A:
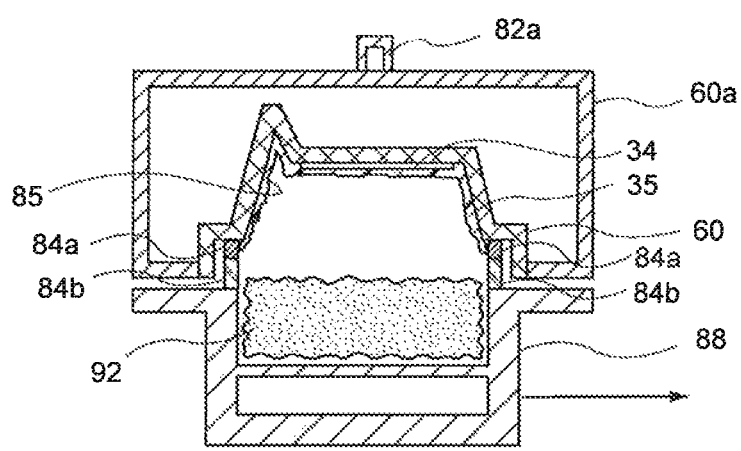
FIG. 9A to 9B are figures supplied to describe the powder slush molding method of the inventions (#2).

After that, they are left still for a predetermined time to have the powder 92 settled out as illustrated in FIG. 9A. Here, it is preferred that the air should be taken out to reduce the pressure so that the powder 92 becomes illiquid condition fast.

Figure 9B:
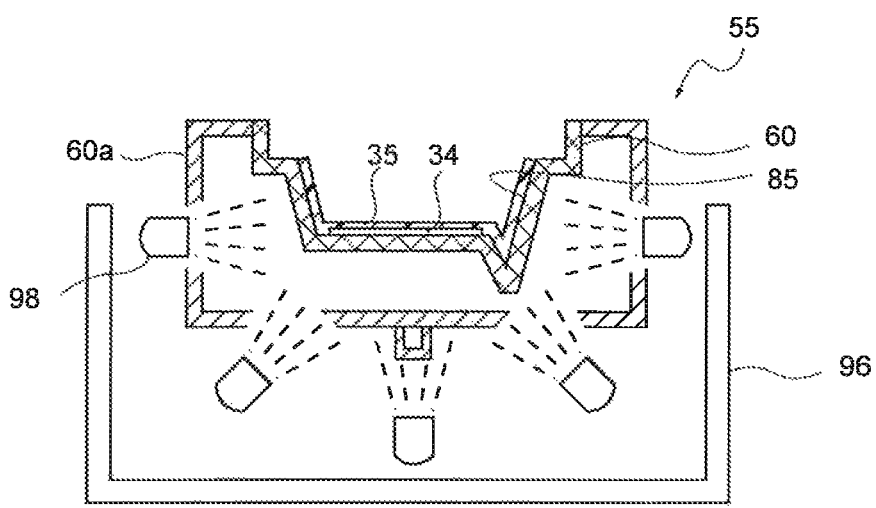

Then, finally, as illustrated in FIG. 9B, the mold 60 is cooled together with the sheet-like article using the cooling device 55.

(2) Mold Flask

Also, it is preferred that mold flasks 84a and 84b having a predetermined thickness (height) should be provided between the mold 60 and the reservoir tank 88 so that the sheet-like article 35 could be formed only on the desired mold face 85 of the mold 60 when the mold 60 comprising the frame member 60a is inverted in the powder slush part (Part A).

Here, structuring the lower part 84b of the mold flask made of, e.g., aluminum and structuring the upper part of 84a of the mold flask combined with a silicone rubber/fluorine resin film could take a role of filling the gap between the mold 60 and the reservoir tank 88.

(3) Second Resin

Also, the second resin used by the powder slush part (Part A) is not especially limited but, for example, one kind or two or more combination kinds of an epoxy resin, an urethane resin, a polyester resin, an acrylic resin, a vinyl chloride resin, an olefin resin, a silicone resin and the like could be used.

Thus, if a thermosetting resin is used as the second resin, it is preferred that half-hardened thermoset resin powder or B-staged thermoset resin powder should be used so that the second resin is hardened faster for forming a predetermined membrane.

Also, if vinyl chloride resin is used as the first resin, it is preferred that an epoxy resin, an urethane resin, an acrylic resin, or a vinyl chloride resin should be used as the second resin to have better adhesiveness.

4. Mold Cooling Part (1) Structure

The mold cooling part (Part C) is, as illustrated in FIG. 9B and FIG. 10A to 10B, a site that cools the mold 60 comprising the frame member 60*a* by the cooling device 55 of water-cooling, air-cooling or the like for solidifying the coating layer 34 and the 2-color molded sheet 36 comprising the sheet-like article 35 into a predetermined degree.

Accordingly, it is preferred that a shower device 98 as illustrated in FIG. 9B and a spray devices 121 as illustrated in FIG. 10A to 10B should be provided together in the mold cooling part (Part C) as the cooling device 55 or 55'.

The reason for this is because such a structure would efficiently prevent a heat damage, a crack, or the like from occurring from the mold.

Also, it is also preferred that the shower device and the spray device should be connected with one water supply tank to decide the spray amount and the shower amount by a switch device like a control valve provided at the blowoff port.

(2) Temperature

It is preferred that the mold cooling part (Part C) should cool a 2-color molded sheet-like article to make the surface temperature of the sheet-like article into the value range of 30° C. to 100° C.

The reason for this is because, if the surface temperature of such a sheet-like article becomes lower than 30° C., too much time of cooling process is required. On the other hand, it is because, if the surface temperature of such a sheet-like article exceeds 100° C., the next demolding process may become difficult.

Accordingly, it is more preferred that the mold cooling part should be in the temperature range of 35° C. to 80° C. for cooling the 2-color molded sheet-like article and the range between 40° C. and 60° C. is further preferred.

Also, the surface temperature of the 2-color molded sheet-like article in the mold cooling part becomes the surface temperature of the 2-color molded sheet-like article measured by a surface temperature gauge or the like right after the cooling process.

5. Mold Changing Part

Also, it is preferred that the powder slush molding apparatus of the inventions should be more provided with a mold changing part (Part D).

More specifically, the molds may be changed for molding different kinds of 2-color molded sheet-like articles during powder slush molding or the mold may have a damage during powder slush molding by use of a mold changing part (Part D). In such a case the molds could be changed under the condition of the powder slush molding apparatus moving.

Accordingly, as illustrated in FIGS. 1 and 2, it is preferred that a supporting table 66 to place the mold 60 should be provided and the supporting table 66 should be movable by an external control.

Further, the embodiment of the mold changing part (Part D) illustrated in FIG. 2 not only shows the condition of the mold 60' for a change and the mold frame member 60*a*' for other change standing by on the supporting table 66 but also shows the condition of the mold 60" and the frame member 60*a*" standing by on the further extending-up supporting table 66 for other change.

6. 2-Color Molded Sheet-Like Article

With respect to the embodiment of the 2-color molded sheet-like article, the structural material is not especially limited but it is preferred that the structure should have at least one of, e.g., an epoxy resin, a vinyl chloride resin, an acrylic resin, an olefin resin, an urethane resin, a polycarbonate resin, and a polyester resin.

The reason for this is because such a structure could use a high-universality, inexpensive, decorative 2-color molded sheet-like article.

Also, it is preferred that thickness of the 2-color molded sheet-like article should be in the range of 10 μm to 2000 μm. The reason for this is because, if the thickness of the 2-color molded sheet-like article is 10 μm or under, the mechanical strength or durability may drop a lot. On the other hand, it is because, if the thickness of the 2-color molded sheet-like article exceeds 2000 μm, handling and adhesion may become difficult.

Accordingly, it is more preferred that the thickness of the 2-color molded sheet-like article should be in the range of 50 μm to 1000 μm and the range of 100 μm to 500 μm is further preferred.

Also, it is preferred that the embodiment of the 2-color molded sheet-like article should be a flat film because of good adhesiveness and easy handling. However, it is also preferred that the surface should be embossed and provided with an opening part (comprising a slit) because of excellent decoration properties.

Moreover, it is also preferred that the surface and inside of the 2-color molded sheet-like article should be printed or colored in a predetermined status. In addition, it is preferred that the 2-color molded sheet-like article should have an external shape suitable for an automobile interior component or bumper as illustrated in FIG. 11A to 11C.

Figure 11A:
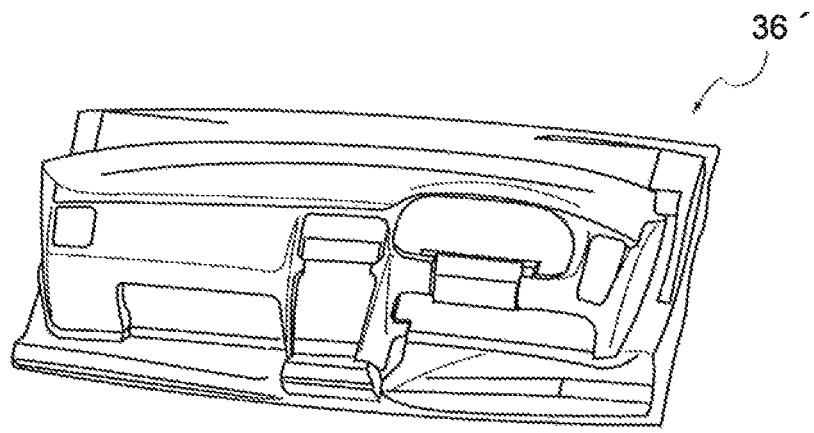
FIG. 11A to 11C are perspective views to show the embodiments of the sheet-like article.
Figure 11B:
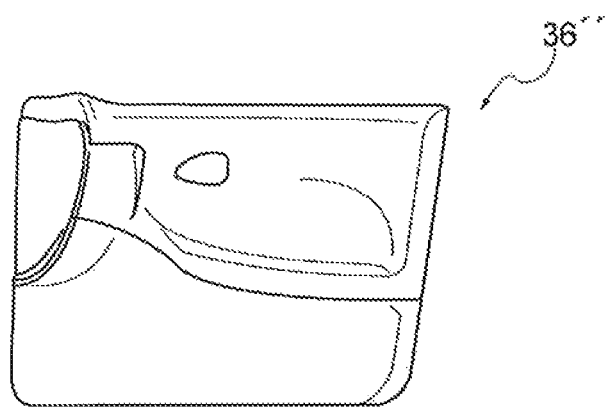
Figure 11C:
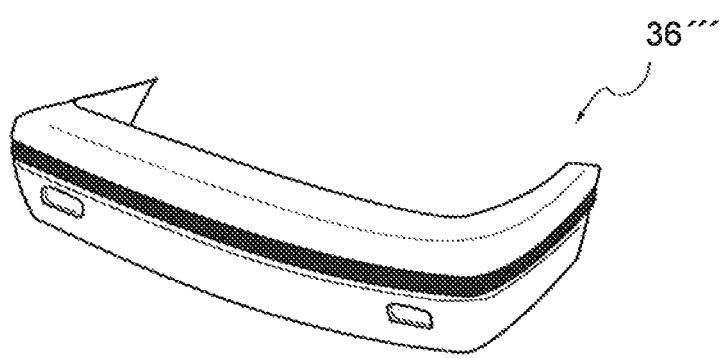

More concretely, FIG. 11A shows a 2-color molded sheet-like article 36' for an automobile front panel surface skin; FIG. 11B shows a 2-color molded sheet-like article 36" for an automobile door surface skin; FIG. 11C shows a 2-color molded sheet-like article 36''' for an automobile bumper.

Second Embodiment

The second embodiment is directed to, as illustrated in FIG. 6A to 6E, the powder slush molding method for molding the 2-color molded sheet-like article using the powder slush molding apparatus 10 provided with the powder slush part (Part A), the mold heating part (Part B), the mold cooling part (Part C), and the coating/demolding part (Part E).

The powder slush molding method for molding the 2-color molded sheet-like article 36 features that the coating/demolding part comprises the resin coating process for coating the first resin 21 on a part of the mold 60 for forming the coating layer 34 with the thickness of 1 μm to 200 μm and the powder slush process for powder slush molding of the sheet-like article 35 on or adjacent to the coating layer 34 consisting of the first resin 21 at the powder slush part, using the second resin which is different from the first resin 21.

1. Coating Process

The coating process is the resin coating process (hereinafter it may refer to a coating process) for coating a predetermined first resin 21 (21') on a part of the mold 60 for forming the coating layer 34 of the thicknesses 1 μm to 200 μm in the coating/demolding part (Part E).

More specifically, the coating process is a process to arrange the mold 60 at a predetermined point for forming the coating layer 34 of a predetermined thickness at a predetermined place of the mold 60 using the spray resin coating device 22 equipping, e.g. the spray nozzle 22a whose end part is L-shaped as illustrated in FIG. 3.

In this case, it is preferred that a masking member 30 should have been mounted at a predetermined place other than at the desired point so that the coating material is not attached.

Then, the coating condition is not especially limited but it is preferred that the coating speed should be 1 s/m$^2$ to 60 s/m$^2$ and the coating speed of 10 s/m$^2$ to 30 s/m$^2$ should be more preferred for forming, e.g. the coating layer of the thicknesses 1 μm to 200 μm.

2. Heating Process

The heating process is a process (hereinafter it may refer to "heating process") to heat the mold 60 forming of the coating layer 34 in the mold heating part (Part B) under its state.

More specifically, it is the process to move the mold 60 formed of the predetermined coating layer 34 from the coating/demolding part (Part E) to the mold heating part (Part B) to supply into a heating furnace 56 as illustrated in FIG. 1, where the predetermined coating layer 34 is dried and the mold 60 is heated up to a predetermined temperature.

Also, it is preferred that that convection heating should be carried out by hot air so that the temperature inside the mold (comprising the coating layer surface) normally becomes 200° C. to 500° C. for molding an even sheet-like article in the next process being the powder slush process.

3. Powder Slush Process

The powder slush process is a process (hereinafter it may refer to as "slush process") for molding a predetermined sheet-like article on the mold 60 formed of the coating layer 34 under such a condition in the powder slush part (Part A).

More specifically, it is the process to move the heated mold 60 with a coating layer from the mold heating part (Part B) to the powder slush part (Part A) for forming the sheet-like article 35 from the powder 92 being the second resin on the coating layer 34 or adjacent to the coating layer 34 as illustrated in FIG. 6E.

Here, it is preferred that, for practicing the slush process, a predetermined-thick sheet-like article 35 should be formed on the molded face 85 of the mold 60 by rotating the mold 60 comprising the frame member 60a and the reservoir tank 88 connecting together as illustrated in FIG. 8C.

More specifically, it is preferred that the mold 60 comprising the frame member 60a combined with the reservoir tank 88 should be inverted in the vertical direction.

The reason for this is because this practice could have the powder 92 in the reservoir tank 88 drop on the mold face 85 by its self-weight so that only the powder 92 contacting with the mold face 85 of the mold 60 could attach with the nearby powder 92 by the heat of the mold 60 for forming the sheet-like article 35 on the mold face 85 of the mold 60 in the melt state in a moment.

Also, it is preferred that the powder 92 is sucked by the agitation room 88a and the pressure in the mold 60 drops as illustrated in FIG. 8B so that the powder 92 does not fly out other than to a predetermined point but could form the sheet-like article 35 only on the desired mold face 85 when the mold 60 comprising the frame member 60a is inverted.

More specifically, it is preferred that a pressure adjustment device (not shown in a figure) that sucks the powder 92 to drop the internal pressure in the mold 60 while the mold 60 is being rotated for powder slush molding and that blows air into the powder 92 of the reservoir tank 88 before powder slush molding should be provided.

4. Mold Cooling Process

The mold cooling process is a process (hereinafter it may be referred to as "mold cooling process") for cooling the mold 60 formed of the 2-color molded sheet-like article 36 in the mold cooling part (Part C).

More specifically, it is the process to move the mold 60 under the condition of the 2-color molded sheet-like article 36 molded from the powder slush part (Part A) to the mold cooling part (Part C) for cooling it down to a predetermined temperature as illustrated in FIG. 9B.

Here, the mold cooling process could be a single cooling process or a multi-step cooling process.

For example, it is preferred that the single cooling process should cool the mold 60 to a comparatively mild temperature between 80° C. and 100° C. or so with water or hot water sprayed by the spray device 121 as illustrated in FIG. 10A.

The reason for this is because such a practice could cool the mold to a comparatively mild temperature to efficiently prevent the mold from damaging, cracking, or the like by heat even if a large complicated mold is unevenly heated.

Also, such a cooling process could efficiently prevent the multiple resin layers in a 2-color molded sheet from detaching or the like.

On the other hand, it is preferred that the 2-step cooling process should have the first cooling step cool the mold 60 to a comparatively mild temperature between 120° C. and 150° C. or so with water or hot water sprayed by the spray device 121 as illustrated in FIG. 10A.

After that, it is preferred that the second cooling step should have, as illustrated in FIG. 9B, the shower device 98 spray comparatively a lot of water or hot water to efficiently cool the mold to the degree, e.g. about 60° C. to 100° C. so that the sheet-like article 35 could be detached by a vaporization enthalpy.

The reason for this is because this practice could not only efficiently prevent the mold from damaging, cracking, or the like by heat but also shorten the time required for cooling.

In addition, the multi-step cooling process could more efficiently prevent multiple resin layers of the 2-color molded sheet from detaching or the like.

5. Demolding Process

The demolding process is a process (hereinafter it is referred to as "demolding process") to demold the 2-color molded sheet-like article in the coating/demolding part.
More specifically, it is the process to move the mold 60 from the mold cooling part (Part C) to the coating/demolding part (Part E) for demolding the 2-color molded sheet-like article 36 from the mold 60.

In addition, the demolding process could be automated using a robot or could be manually operated for demolding the 2-color molded sheet-like article.

Third Embodiment

Figure 13:
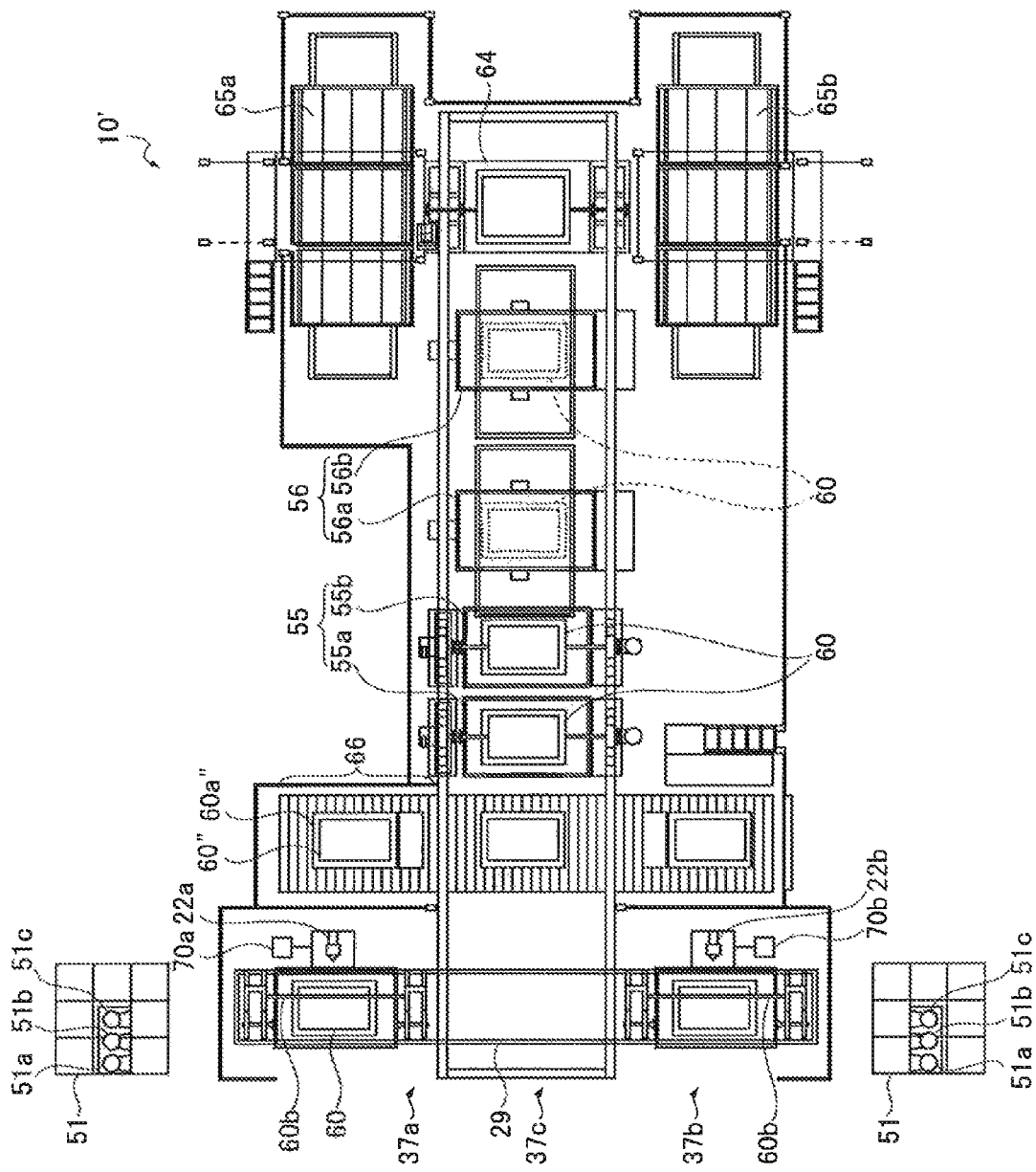
FIG. 13 is a plan view to describe the powder slush molding device of the second embodiment.

The third embodiment is a modified one of the first embodiment of a powder slush molding apparatus 10', as illustrated in FIG. 12 and FIG. 13, wherein the resin coating device 22 comprises the first resin coating device 22a and the second resin coating device 22b; the coating/demolding part (Part E) is provided with the first coating/demolding part 37a having the first resin coating device 22a, the second coating/demolding part 37b having the second resin coating device 22b, and the mold stand-by position 37c between the first coating/demolding part 37a and the second coating/demolding part 37b; the resin coating devices 22a and 22b are respectively provided on the side and other side where the 2-color molded sheet-like article (not shown in a figure) is demolded via the mold inverting device 60b in the first coating/demolding part 37a and the second coating/demolding part 37b.

Figure 14:
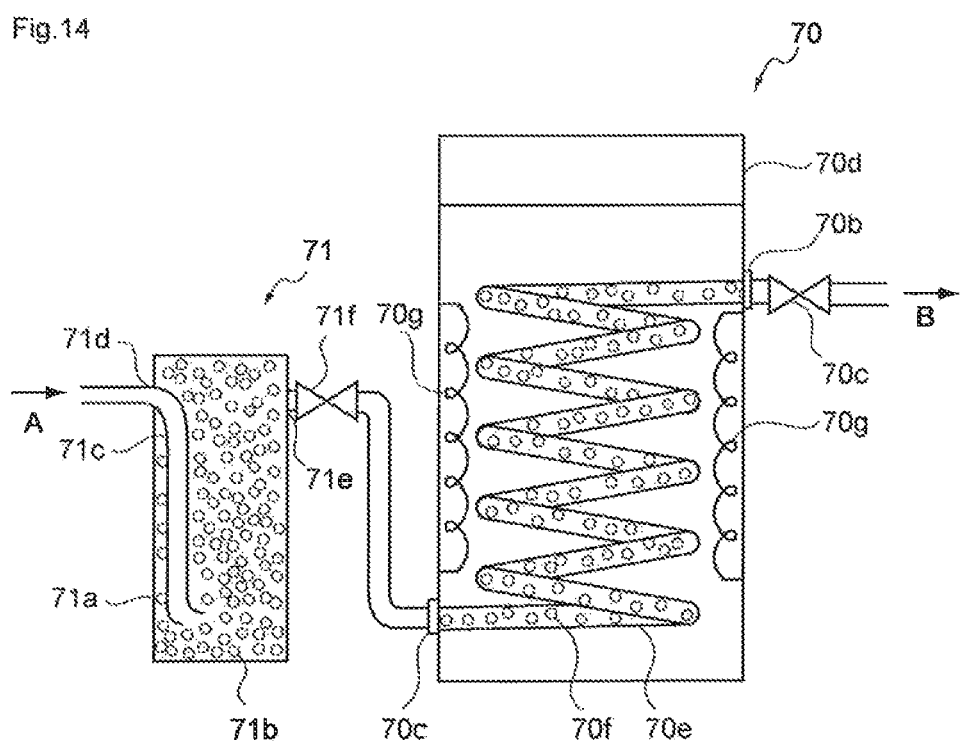
FIG. 14 is a view supplied to describe the temperature control device and the air-drying device.
Figure 15A:
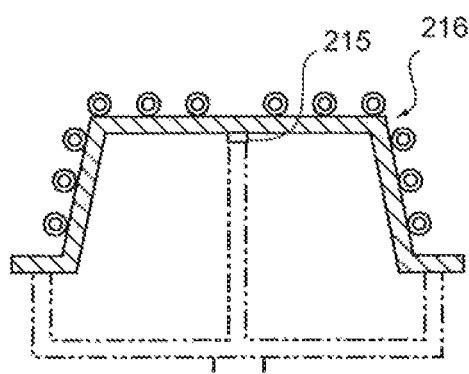
FIG. 15 is a view supplied to describe a conventional powder slush molding method.
Figure 15B:
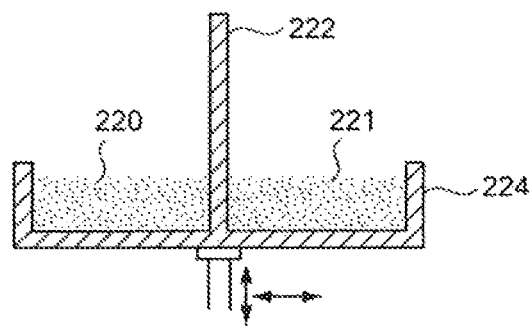

Thus, the temperature control device 70 and the air drying device 71 shown in FIG. 14 are the structure of a powder slush molding apparatus 10' between a compressor (not shown in a figure) for producing atomized air like compressed air and an atomized-air inlet (not shown in a figure) connecting each other in the resin coating device 22.

The following are the concrete descriptions explained mainly about the differences between the powder slush molding apparatus in the first embodiment and the powder slush molding apparatus in the third embodiment.

1. Coating/Demolding Part (1) First Coating/Demolding Part

As illustrated in FIG. 13, the first coating/demolding part 37a comprises the first resin coating device 22a out of multiple resin coating devices 22, basically is a site to carry out a demolding job of the 2-color molded sheet-like article from the mold 60 and a coating job to the mold 60 by the first resin coating device 22a respectively as similar to the coating/demolding part of the first embodiment.

However, it features in the first coating/demolding part of the third embodiment that the first resin coating device 22a is provided on the opposite side of the side where a 2-color molded sheet-like article is demolded via the mold inverting device 60b.

More specifically, such a structure could completely eliminate an interference between the motion of the resin coating device and operator's job for demolding the 2-color molded sheet-like article or the like to carry out independent motions respectively.

Accordingly, it could omit predetermined concurrent motions on both sides of the mold under the condition of the mold standing vertically via the mold inverting device, the shutter for securing a job space, the drive part and the like.

In addition, the mold inverting device is, e.g., a rotary shaft that rotates or half rotates the mold in the same direction or in the opposite direction and is electrically or mechanically connected with a drive member or the like. Then the mold-inverting device could compose of a part of the frame member and is preferred to have a stopper for stopping the mold at a fixed position.

(2) Second Coating/Demolding Part

As illustrated in FIG. 13, the second coating/demolding part 37b comprises the second resin coating device 22b out of multiple resin coating devices 22, is arranged parallel with the first coating/demolding part 37a, and is a site to basically carry out a demolding job of a 2-color molded sheet-like article from the mold 60 and a coating job to the mold 60 by the second resin coating device 22b respectively as similar to the coating/demolding part of the first embodiment.

Thus, the second coating/demolding part 37b features that the second resin coating device 22b is provided on the opposite side of the side where a 2-color molded sheet-like article is demolded via the mold inverting device 60b.

(3) Mold Stand-by Position

The mold stand-by position 37c is, as illustrated in FIG. 13, a stand-by position where the mold 60 coming through a first resin coating job by the respective resin coating devices 22a and 22b in the first coating/demolding part (Part E) 37a and the second coating/demolding part (Part E) 37b adjusts the time for moving to the mold heating part (Part B) being the heating process point in the next process or the mold 60 coming through the mold cooling part (Part C) being the cooling process point adjusts the time for moving to the first coating/demolding part 37a and the second coating/demolding part 37b.

Accordingly, such a mold stand-by position could not only make simultaneous motions of multiple molds smooth but also adjust a predetermined time according to the coating situations of the first coating/demolding part and the second coating/demolding part or according to the mold cooling process or the like.

2. Atomized Air Temperature Control Device (1) Temperature Control Device

The temperature control device 70 as shown in FIG. 14 is a so-called air line heater that is a device for heating up the air coming from a compressor or the like indicated by the arrow A to a predetermined temperature to flow it into the direction indicated by the arrow B for a use as atomized air.

Concretely, it is provided with an inlet 70c and an outlet 70b for compressed air or the like and a pipe 70e is provided between them to indirectly heat up the compressed air or the like passing through the pipe 70e via the pipe wall of the pipe 70e using a heater 70g as a heat source. Accordingly, such a temperature control device 70 could, even if it is so small, not only heat up the compressed air or the like evenly but also extend the heat source lifetime of the heater or the like by the indirect heat.

Further, the pipe 70e is filled with an inorganic porous material 70f such as silica particle, silica gel, alumina, zirconia or the like to make the area contacting with the compressed air or the like bigger. So if the temperature control device 70 is so small and the pipe 70e in it is so short, the compressed air or the like could be heated up faster and evenly.

So, for example, a processing amount of compressed air 500 NL/min to 1000 NL/min at 20° C. could be quickly heated up to the temperature 50° C. to 80° C.

(2) Air Drying Device

It is preferred that the air drying device 71 should be provided between the compressor and the temperature control device to reduce moisture from the compressed air or the like as illustrated in FIG. 14.

More specifically, as illustrated in FIG. 14, a cabinet 71a is filled with adsorbent 71b like silica gel or the like to efficiently adsorb and eliminate the moisture by letting the compressed air or the like pass through it.

So, using such an air drying device 71 together could carry out the temperature control by the temperature control device 70 easier and faster.

EXAMPLE

Example 1

1. Making Sheet-Like Article (1) Mold Preparation Process

A predetermined mold was prepared in the coating/demolding part (Part E) as illustrated in FIG. 6A.

(2) Coating Process

Then, in the coating/demolding part (Part E), a masking member was mounted on the mold as illustrated in FIG. 6B and then a 20-μm thick coating layer was molded using the resin coating device and using the thermal resistance vinyl chloride resin (100 weight parts of N-maleimide grafted polymerized vinyl chloride resin, 10 weight parts of hardener, 5 weight parts of plasticizer, 2 weight parts of tribasic lead sulfate, 2 weight parts of lead stearate) as the first resin at a predetermined point as illustrated in FIG. 6C.

(3) Heating Process

Then, the mold was moved from the coating/demolding part (Part E) to the mold heating part (Part C) to remove and mount the masking member as illustrated in FIG. 6D and then the surface temperature of the mold formed of a predetermined coating layer was heated up to 300° C. by the heating furnace as illustrated in FIG. 1.

(4) Powder Slush Process

Then, the mold was moved from the mold heating part (Part B) to the powder slush part (Part A) for powder slush molding the powder comprising a B-stage epoxy resin to a predetermined coating layer using the powder slush molding apparatus as illustrated in FIG. 6E.

(5) Cooling Process

Then, the mold was moved from the powder slush part (Part A) to the mold cooling part (Part C) for cooling the mold by the shower to the surface temperature 100° C. of the 2-color molded sheet-like article.

(6) Demolding Process

Then, the mold was moved from the mold cooling part (Part C) to the coating/demolding part (Part E) and the 2-color molded sheet-like article was manually demolded to have the 2-color molded sheet-like article in the example 1.

2. Evaluation of 2-Color Molded Sheet-Like Article (1) Detachability (Evaluation 1)

Detachability was evaluated from a detaching method of a 2-color molded sheet-like article in accordance with the following criteria:

Very good: The 2-color molded sheet-like article could be detached in less than 1 minute.
Good: The 2-color molded sheet-like article could be detached but it takes 1 minute or more.
Fair: The 2-color molded sheet-like article could be detached but a part of a coating layer may happen to damage.
Bad: It is difficult to detach the 2-color molded sheet-like article.

(2) Evaluation of Adhesion Strength (Evaluation 2)

Adhesion of a sheet-like article with a coating layer of the 2-color molded sheet-like article was measured based on 90° peel adhesion strength of the sheet-like article/coating layer and such adhesion was evaluated in accordance with the following criteria:

Very good: 90° peel adhesion strength is 1000 gf/in or more.
Good: 90° peel adhesion strength is 500 to below of 1000 gf/in.
Fair: 90° peel adhesion strength is 100 to below of 500 gf/in.
Bad: 90° peel adhesion strength is below of 100 gf/in.

(3) Variation of Membrane Thicknesses (Evaluation 3)

Ten points of thicknesses at the place where the coating layer of the 2-color molded sheet-like article was formed were measured and evaluated from the following criteria (difference between the maximum value and the minimum value) as the variation of the membrane thicknesses.

Very good: The difference between the maximum value and the minimum value is less than 10 μm.
Good: The difference between the maximum value and the minimum value is 10 μm to below of 50 μm.
Fair: The difference between the maximum value and the minimum value is 50 μm to below of 100 μm.
Bad: The difference between the maximum value and the minimum value is 100 μm or more.

Examples 2 to 4

In examples 2 to 4, similar evaluation was respectively carried out like the example 1 under the condition of the coating layer thickness changed in the 2-color molded sheet-like article.

Examples 5 to 8

In examples 5 to 8, same evaluation was respectively carried out as the examples 1 to 4 except that the first resin from which thermal stabilizer (tribasic lead sulfate and lead stearate) was removed is used.

Comparison Examples 1 to 2

In comparison examples 1 to 2, same evaluation was respectively carried out as the example 5 or the example 1 except that the coating layer thicknesses is changed to 500 μm and 1000 μm respectively.

TABLE 1

| | Coating layer | | | | | |
|---|---|---|---|---|---|---|
| | Thickness (μm) | Heat stabilizer | Slush layer (μm) | Evaluation 1 | Evaluation 2 | Evaluation 3 |
| Example 1 | 20 | Used | 500 | Very good | Very good | Very good |
| Example 2 | 10 | Used | 500 | Very good | Very good | Very good |
| Example 3 | 30 | Used | 500 | Very good | Very good | Very good |
| Example 4 | 80 | Used | 500 | Very good | Good | Good |
| Example 5 | 20 | Unused | 500 | Fair | Good | Good |
| Example 6 | 10 | Unused | 500 | Fair | Good | Good |
| Example 7 | 30 | Unused | 500 | Fair | Good | Good |
| Example 8 | 80 | Unused | 500 | Fair | Fair | Good |
| Comparison example 1 | 500 | Unused | 500 | Fair | Bad | Bad |
| Comparison example 2 | 1000 | Unused | 500 | Bad | Bad | Bad |

Examples 9 to 16

In examples 9 to 16, similar evaluation was respectively carried out based on the 2-color molded sheet-like article which was manufactured by the powder slush molding apparatus shown in FIG. 12 and FIG. 13 like the examples 1 to 8.

However, in the powder slush molding apparatus, a compressor was used to the air inlet at the atomized air hole via the temperature control device and the air drying device as shown in FIG. 14. More specifically, the examples 1 to 8 used atomized air of normal temperature (about 20° C.) while the examples 9 to 16 used atomized air heated up to temperature 40° C. Moreover, the thickness of the slush layer in the examples 13 to 16 was 800 μm. The results are as indicated in Table 2.

TABLE 2

| | Coating layer | | | | | |
|---|---|---|---|---|---|---|
| | Thickness (μm) | Heat stabilizer | Slush layer (μm) | Evaluation 1 | Evaluation 2 | Evaluation 3 |
| Example 9 | 20 | Used | 500 | Very good | Very good | Very good |
| Example 10 | 10 | Used | 500 | Very good | Very good | Very good |
| Example 11 | 30 | Used | 500 | Very good | Very good | Very good |
| Example 12 | 80 | Used | 500 | Very good | Very good | Very good |
| Example 13 | 20 | Unused | 800 | Good | Very good | Very good |
| Example 14 | 10 | Unused | 800 | Good | Good | Very good |
| Example 15 | 30 | Unused | 800 | Good | Very good | Very good |
| Example 16 | 80 | Unused | 800 | Good | Good | Very good |

INDUSTRIAL APPLICABILITY

According to the present inventions, the powder slush molding apparatus and the powder slush molding method of these inventions could apply a first resin at a predetermined point of the mold using the resin coating device to carry out powder slush molding of a second resin on or adjacent to a predetermined-thickness coating layer consisting of the first resin to have good adhesiveness of the coating layer with the resin layer formed by powder slush molding, consequently could have a durable 2-color molded sheet-like article quickly and stably.

In addition, a predetermined-thickness coating layer consisting of the first resin was formed not by a powder slush molding but by a predetermined resin coating device, so the border became clear and hard to detach and a decorative 2-color molded sheet-like article could be obtained.

So, the obtained 2-color molded sheet-like article is expected to suitably use as interior materials or bumpers of automobiles and the like.

What is claimed is:

1. A powder slush molding apparatus having a powder slush part, a mold heating part, a mold cooling part, and a coating/demolding part for molding a 2-color molded sheet-like article;
    wherein the coating/demolding part is provided with a resin coating device to coat a first resin, which is alone or in combination of two or more kinds of an epoxy resin, a phenolic resin, a silicone resin, a polyimide resin, a polyvinylchloride resin and a fluorine resin at a part of a mold for forming a coating layer of 1-200 μM thickness,
    wherein the resin coating device provided in the coating/demolding part is a spray resin coating device,
    a spray nozzle having a resin coating hole, an atomizing air hole, and a pattern air hole is mounted at the end part of the spray resin coating device,
    a compressor is connected to an air inlet at the atomized air hole which is via a temperature control device comprising an air line heater for heating up a compressed air to temperatures of between about 50° C. and 80° C.,
    an air drying device is provided between the compressor and the temperature control device,
    the powder slush part is provided with a powder slush device for powder-slush-molding the sheet-like article consisting of a second resin which is different from the first resin on or adjacent to the coating layer consisting of the first resin, and
    the mold heating part is provided with a heating furnace for heating the surface temperature of the mold formed of the coating layer being in the range of 200° C. to 500° C.

2. The powder slush molding apparatus as set forth in claim 1, wherein the end part of the spray nozzle is L-shaped.

3. The powder slush molding apparatus as set forth in claim 1, wherein the spray resin coating device is further provided with a first tank for storing the first resin and a second tank for storing a wash liquid for automatically washing the spray resin coating device.

4. The powder slush molding apparatus as set forth in claim 1, wherein the resin coating device is movably provided between a moving position and a stationary position and a shutter for, if the resin coating device is at the moving position, dividing and forming a motion area of the resin coating device is provided in the coating/demolding part.

5. The powder slush molding apparatus as set forth in claim 1, wherein the resin coating device is provided on the same side of the side where the 2-color molded sheet-like article is demolded or on the opposite side of the side where the 2-color molded sheet-like article is demolded via a mold inverting device in the coating/demolding part.

6. The powder slush molding apparatus as set forth in claim 1, wherein not only the resin coating device comprises a first resin coating device and a second resin coating device but also the coating/demolding part is provided with a first coating/demolding part having the first resin coating device and a second coating/demolding part having the second resin coating device and also a predetermined space is provided between the first coating/demolding part and the second coating/demolding part for the mold to temporarily stand by.

7. The powder slush molding apparatus as set forth in claim 1, wherein a masking device is further provided in the said coating/demolding part for not coating the first resin other than on the predetermined mold part.

8. The powder slush molding apparatus as set forth in claim 1, wherein a mold release agent resin coating device is further provided in the coating/demolding part for coating a mold release agent on the mold.

\* \* \* \* \*